(12) United States Patent
Zhang

(10) Patent No.: US 8,717,894 B2
(45) Date of Patent: May 6, 2014

(54) SYNCHRONIZATION, SCHEDULING, NETWORK MANAGEMENT AND FREQUENCY ASSIGNMENT METHOD OF A LAYERED WIRELESS ACCESS SYSTEM

(75) Inventor: Shizhuang Zhang, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 319 days.

(21) Appl. No.: 13/002,108

(22) PCT Filed: Jul. 3, 2008

(86) PCT No.: PCT/CN2008/071543
§ 371 (c)(1),
(2), (4) Date: Dec. 30, 2010

(87) PCT Pub. No.: WO2010/000110
PCT Pub. Date: Jan. 7, 2010

(65) Prior Publication Data
US 2011/0122769 A1     May 26, 2011

(51) Int. Cl.
*H04L 1/00* (2006.01)
(52) U.S. Cl.
USPC .......... 370/235; 370/328; 370/329; 370/336; 370/345; 370/350
(58) Field of Classification Search
USPC ................. 370/235, 328, 329, 336, 345, 350
See application file for complete search history.

(56) References Cited

U.S. PATENT DOCUMENTS

| | | | |
|---|---|---|---|
| 5,734,687 A * | 3/1998 | Kainulainen | 375/357 |
| 7,126,937 B2 * | 10/2006 | Crosbie et al. | 370/350 |
| 7,190,703 B1 | 3/2007 | Heitmann | |
| 7,301,926 B1 * | 11/2007 | Dietrich et al. | 370/338 |
| 7,302,256 B1 * | 11/2007 | O'Hara et al. | 455/418 |
| 7,340,247 B1 | 3/2008 | O'Hara, Jr. et al. | |
| 7,397,824 B2 | 7/2008 | Okubo | |
| 7,447,237 B2 | 11/2008 | Koshino et al. | |
| 2002/0024425 A1 * | 2/2002 | Chiriatti | 340/310.01 |
| 2004/0160903 A1 * | 8/2004 | Gai et al. | 370/254 |

(Continued)

FOREIGN PATENT DOCUMENTS

| CN | 1514618 A | 7/2004 |
|---|---|---|
| CN | 1798371 A | 7/2006 |

(Continued)

OTHER PUBLICATIONS

International Search Report for PCT/CN2008/071543 dated Apr. 1, 2009.

*Primary Examiner* — Xavier Szewai Wong
*Assistant Examiner* — Natali N Pascual Peguero
(74) *Attorney, Agent, or Firm* — Banner & Witcoff, Ltd.

(57) ABSTRACT

The present invention discloses as synchronization method of a layered wireless access system, which is applied to the layered wireless access system including an access point management unit located in an access layer and its linked access points. The access point management unit has a timing server, each access point having a timing client. The timing server generates timing information and distributes it to the timing client of each linked access point, and the timing client recovers the timing information as a local timing reference signal. The method may implement clock synchronization between the access point management unit and the access points to ensure the normal operation of the system. The present invention also provides network management, scheduling, frequency assignment and flow control methods based on the layered wireless access system.

26 Claims, 12 Drawing Sheets

(56) References Cited

U.S. PATENT DOCUMENTS

| | | | |
|---|---|---|---|
| 2005/0281247 A1* | 12/2005 | Lim et al. | 370/350 |
| 2006/0039309 A1* | 2/2006 | Lee et al. | 370/312 |
| 2007/0201540 A1* | 8/2007 | Berkman | 375/219 |
| 2008/0159125 A1* | 7/2008 | Ando et al. | 370/221 |
| 2009/0285121 A1* | 11/2009 | Tzannes | 370/254 |

FOREIGN PATENT DOCUMENTS

| | | |
|---|---|---|
| CN | 1826008 A | 8/2006 |
| CN | 1855915 A | 11/2006 |
| CN | 101030926 A | 9/2007 |
| CN | 101047557 A | 10/2007 |
| EP | 1124356 A2 * | 8/2001 |
| JP | 2002-538688 | 11/2002 |
| JP | 2003-509973 | 3/2003 |
| JP | 2004-186877 | 7/2004 |
| JP | 2004-349882 | 12/2004 |
| WO | 0051366 | 8/2000 |
| WO | 02065707 A2 | 8/2002 |
| WO | WO 2008029411 A2 * | 3/2008 |

* cited by examiner

SYNCHRONIZATION, SCHEDULING, NETWORK MANAGEMENT AND FREQUENCY ASSIGNMENT METHOD OF A LAYERED WIRELESS ACCESS SYSTEM

TECHNICAL FIELD

The present invention relates to a wireless access system, and more particularly, to a layered wireless access system, an access point management unit in the system and a related method based on this system.

TECHNICAL BACKGROUND

A mobile network architecture of the existing WiMAX (Worldwide Interoperability for Microwave Access) is illustrated in FIG. 1. The architecture comprises a terminal CPEs (Customer Premises Equipment) 101 of the WiMAX, BSs (Base Station) 102 of a WiMAX access network, ASN-GWs (Access Service Network GateWay, access network for short) 104, and PDNs (Packet Data Network) or SDHs (Synchronous Digital Hierarchy) 105. The CPE 101, BS 102 and ASN-GW 103 form an ASN (Access Service Network) of the WiMAX. In regard to interconnection, standard R1 interface is used between the CPE 101 and BS 102, standard R6 interface is used between the BS 102 and ASN-GW 103, standard R8 interface is used between several BSs 102, standard R4 interface is used between several ASN-GWs 103, R3 interface is used between the ASN-GW 103 and CSN 104, and the PDN/SDH 105 is a transmission bearing network of the WiMAX.

Since current main frequency bands of wireless frequencies of a WiMAX system are 2.3/2.5/3.5 GHz, if the conventional integrated macro base station outdoor-covering-indoor method is used, penetration loss, which is generally 18-25 dB in budget, is larger in dense urban area. Thus, using simply the outdoor-covering-indoor method will lead to the reduced outdoor covering radius and the increased number of outdoor stations, thereby increasing network construction cost and augmenting difficulty of rapid network layout. Moreover, traffic-concentrated hotspots, enterprises and business buildings have relatively high requirement for capacity and need high signal to noise ratio in coverage areas so as to be able to satisfy requirement for high-order modulation, such as 16QAM or even 64QAM. The conventional outdoor macro base station and micro base station method cannot satisfy such requirement.

In sum, for the WiMAX and subsequent 4G networking, it is recommended to use a Pico Cell scheme to supplement indoor coverage in cities and dense urban areas. The existing Pico Cell scheme further comprises a baseband pool+Pico RRU method and an integrated Pico base station method. The present invention lays emphasis on an integrated Pico BS-based improvement scheme and device management discussion.

Nowadays, mobile systems usually use the following schemes to deploy access points.

Scheme 1: a number of access points with stand-alone configuration, i.e., Pico BSs, are used in coverage areas; the access points are connected to an access gateway in a central computer room through a transmission network. This scheme is an illustration of an indoor coverage network based on the conventional Pico BS architecture.

The network architecture of this scheme is shown in FIG. 2, in which a Pico BS 201 is deployed in each coverage area (a certain area in a floor as shown in FIG. 2); a number of access points with stand-alone configuration, i.e., Pico BSs 201, are connected through an aggregated switch or router 202; the switch or router 202 provides a R6 interface to a transmission network PDN/SDH 203. Each Pico BS 201 needs to configure a GPS module in order to solve the problem of TDD (Time Division Duplex) system synchronization and prevent system networking interference. The access pints in an area are adjacent in physical locations, however, there is no logic channel communication between them, that is, there is no local access management unit in the whole building or a group of buildings, the communication between the Pico BSs 201, including switching control information among the base stations and user interface information interaction between the access points in the area must be routed to an ASN-GW 204 of a central computer room node via the PDN/SDH 203, and be connected to a CSN 205, and then be processed and sent to a target base station, which is an great waste for bandwidth of the SDH/PDH network. At the same time, due to performance deterioration, such as delay and jitter, caused by public network routing, user experience is degraded significantly. In business buildings and CBD (Center Business District) with medium and large capacity, handover usually occurs in overlapping coverage areas, such as areas between floors, areas between floors and elevators, and aisles. Moreover, requirement for handover is relatively frequent. In the traditional Pico BS architecture, the Pico BS needs to support interfaces, such as twisted pair, optical fiber or coaxial cable, thus GPS antennas are required to be configured to solve the problem of synchronization, which brings relatively large difficulty for indoor deployment, goes against network performance optimization, and does not solve a lot of scenarios or causes heavy cost.

Scheme 2: a Pico/Micro/Pico BS is used to provide a signal source in a coverage area, and RF signals are assigned to a plurality of antenna units through a passive distributed system, power of each antenna unit being equivalent to power of an access point. This scheme is an illustration of is an indoor coverage network based on a signal source base station+passive distributed antenna system architecture and is suitable for small scale indoor coverage networks.

The network configuration of this scheme is shown in FIG. 3, in which a Signal Source BS 301 may be a Micro BS or a Pico BS, depending on indoor coverage scale and network topology. The Signal Source BS provides RF (Radio Frequency) signal to a Power Dividor 302 and a Coupler 303. With layer-by-layer assignment, signals are output to a ceiling mount antenna 304 and a wall mount antenna 305. Type selection of specific antennas is determined by indoor terrain and network planning. The difference between the Power Dividor 302 and the Coupler 303 is that the Power Dividor 302 equally divides power, while the coupler 303 is able to assign power at different ratios to different ports. Using the Pico/Micro/Pico BS to provide the signal source, RF signals are assigned to the plurality of antenna units through the passive distributed system, and the power of each antenna unit equals to the power of the access point. The disadvantage of this scheme is that the Signal Source BS is required to provide relatively large power, the passive distributed system is not suitable for medium and large scale indoor coverage system networking due to its large transmission loss, and cell capacity expansion needs larger workload of engineering construction and deployment.

Scheme 3: a Pico/Micro/Pico BS (shown as 401) is used to provide a signal source in a coverage area, and RF signals are assigned to a plurality of antenna units through an active distributed system, power of each antenna unit being equivalent to power of an access point. This scheme is an illustration an indoor coverage network based on a source base station+ active distributed antenna system architecture and is suitable for large scale indoor coverage network.

The network configuration of this scheme is shown in FIG. 4, in which functions connection modes of a Signal Source BS 401, a Power Dividor 402, a Coupler 403, a ceiling mount antenna 404 and a wall mount antenna 405 are the same as those of the indoor coverage network of the passive antenna system architecture shown in FIG. 3. The difference between the active distributed system shown in FIG. 4 and the passive distributed system is that a trunk amplifier 404 is deployed at a position of middle trunk where signal attenuation is relatively large to compensate for the loss caused by line transmission. Since 802.16e is a TDD system, it has strict requirement for time synchronization, and the trunk amplifier 404 is able to extract a transmitting and receiving sequence synchronization signal to compensate for symbol transmitting and receiving sequence caused by different line delays. Using the Pico/Micro/Pico BS to provide the signal source, RF signals are assigned to the plurality of antenna units through the active distributed system, and the power of each antenna unit equals to the power of the access point. This scheme needs to add the trunk amplifier 404 in the middle of transmission line to compensate for line loss and is suitable to medium and large scale indoor coverage networks. However, its disadvantage is that it goes against subsequent capacity expansion, and the TDD system needs to solve the problem of coexistence with the existing systems and the increased cost caused by the introduction of middle nodes. Furthermore, both the cost and workload of maintenance and capacity expansion are relatively large, thereby bringing related problems, such as system reliability.

Although the above description takes a Wimax system as an example, other existing wireless access systems and methods of indoor coverage scenarios or indoor-outdoor combined coverage scenarios also have the following disadvantages.

1) Requirement for indoor cable resource is higher, distributed systems, such as sufficient optical fibers, twisted pairs or coaxial cables, are required; some operators (overseas operators of emerging markets) do not have optical fiber resources or twisted pair resources in most buildings, thus it is very difficult to accelerate networking and decrease deployment cost;

2) In view of the particularity of the TDD system, some operators having 2G/3G indoor coverage need to modify significantly indoor antennas and filters in order to share available distributed systems, thus engineering quantity is enormous, network services have to be interrupted during the modification, and smooth network upgrade cannot be achieved;

3) The deployment of the newly established stand-alone indoor distribution project is relatively difficult and the existing space structure is also needed to be modified, which makes project coordination difficult;

4) With a Pico BS configuring GPS method, if a number of Pico BSs are deployed in medium and large scale indoor coverage scenarios, installation engineering quantity will be huge and maintenance cost will be very high;

5) There are problems of management and local maintenance, as well as switching performance deterioration in individual Pico BS access points;

6) Information interaction between the individual Pico BS access points would decrease transmission efficiency;

7) The individual Pico BS access points will introduce problems of performance bottleneck and expansion in the centralized network management during performance statistics or version upgrade; and 8) There are problems of capacity expansion, scale and performance in the indoor distributed system.

SUMMARY OF THE INVENTION

A technical problem to be solved by the present invention is to provide a synchronization method of a layered wireless access system so as to achieve clock synchronization between an access point management unit and access points and ensure proper operation of the system.

In order to solve the above problem, the present invention provides a synchronization method of a layered wireless access system. The method is applied to the layered wireless access system including an access point management unit located in an access layer and its linked access points. The access point management unit has a timing server, each access point has a timing client, the timing server generates timing information and distributes it to the timing client of each linked access point, and the timing client recovers the timing information as a local timing reference signal.

Further, the synchronization method may also have the following feature:

The timing server is a packet timing server, i.e., a ToP server, the timing client is a packet timing client, i.e., a ToP client; the ToP server is configured to generate hardware time stamp based on timing reference signals output by a GPS receiving module or an external synchronization clock source, and send packet timing information packets to each ToP client through network interfaces at sides of the access point management unit and the access points based on address information of each access point; after the ToP client receives the timing information packets, it recovers and sends the timing information to a baseband and RF module in the access points as a timing reference signal of the baseband and RF module.

Furthermore, the synchronization method may have the following feature:

The access point management unit is a master access point management unit having access gateway function, and communication cables or power lines are used as transmission media between the master access point management unit and its linked access points; or The access point management unit comprises a master access point management unit having access gateway function and one or more slave access point management units connected to the master access point management unit, the master access point management unit and slave access point management units which are connected directly to the linked access points have power line modulation and demodulation function, and power lines are used as transmission media for the linked access points which are directly connected.

Further, the synchronization method may have the following feature:

In the timing server and timing client, the type of Quality of Service (QoS) of the timing information is configured to have the same priority as or higher priority than real-time services, a scheduling strategy corresponding to this type of QoS is performed at the sides of the access point management unit and the linked access points, respectively, and the timing information is distributed and routed according to requirements which are the same as or better than those of the real-time services.

Further, the synchronization method may have the following feature:

An end-to-end flow control mechanism is achieved between the access point management unit and the access points, and when the access points are not synchronous with the access point management unit, the flow control mechanism is enabled and data is sent according to a normal process after the synchronization.

Further, the synchronization method may also have the following feature: the layered wireless access system also uses one or more of the following methods to improve synchronization performance:

Upon power-up initializing, the timing server in the access point management unit sends timing information data to the linked access points by broadcasting the shortest packet in a subnet;

In an initial access state, the access points which are newly added into the network only transmit basic timing packets and state configuration information to the access point management unit; the access point management unit controls whether the access points can be powered up and started up normally according to feedback situation of access point synchronization state information;

Loosely coupled phase-locked loop, narrowband loop and adaptive filter algorithms are used to filter out jitter and drifting in the Ethernet; an adaptive maintaining HOLDOVER algorithm is used to automatically check network synchronization quality, and automatically memorize control parameters in the case of optimal synchronization performance; when the network quality deteriorates, a HOLDOVER state is automatically entered, and current control parameters are refreshed using the memorized control parameters;

The access point management unit adjusts sending frequency of ToP messages and optimizes synchronization performance when bandwidth occupancy rate of transmission data of all nodes is lower than a preset threshold;

The access point management unit continuously measures status of network, and data packets are normally routed to each access point in the case of no congestion; once the congestion occurs, a strategy based packet loss mechanism is implemented and performance of services with high priority is guaranteed.

Another technical problem to be solved by the present invention is to provide a flow control method of a layered wireless access system so as to control flow and ensure proper operation of the system.

In order to solve the above technical problem, the present invention provides a flow control method of a layered wireless access system which comprises an access point management unit located in an access layer and its linked access points. The flow control method comprises:

when media packets arrive at the access point management unit, after sorted and labeled, the packets entering into a queue of each access point according to a destination address and being sent to corresponding access points, and end-to-end flow control being established between the access point management unit and each access point.

Furthermore, the flow control method may have the following feature:

The access point management unit configures a guaranteed bandwidth and maximum available bandwidth of a downlink of each linked access point; and When controlling flow of the downlink, the access point management unit identifies and records flow of each linked access point, and normally stores and forwards data of the linked access point if the recorded flow of the linked access point is within a range of the preset guaranteed bandwidth, uses a weighted fair algorithm to assign the remaining bandwidth to an overloaded linked access point queue if the recorded flow of the linked access point is beyond the range of the guaranteed bandwidth but smaller than the maximum available bandwidth, and then discards packets in a best-effort BE service queue of the linked access point first if the recorded flow of the linked access point is still overloaded.

Further, the flow control method may have the following feature:

The access point management unit configures a guaranteed bandwidth and maximum available bandwidth of an uplink of each linked access point;

The access point controls downlink flow, and when assigning bandwidth to each terminal user according to downlink bandwidth, guarantees that the assigned flow does not exceed the maximum available bandwidth;

When the access point management unit detects that overall bandwidth exceeds load threshold of its processing ability, it sends a flow control message to the access points in which the flow exceeds the guaranteed bandwidth, and after the access points receive the flow control message, the bandwidth is decreased to a range of the guaranteed bandwidth.

Still another technical problem to be solved by the present invention is to provide a scheduling method based on a synchronization state in a layered wireless access system so as to decrease requirement for synchronization accuracy and increase system robustness.

In order to solve the above technical problem, the present invention provides a scheduling method based on a synchronization state in a layered wireless access system which comprises an access point management unit located in an access layer and its linked access points. The scheduling method comprises:

configuring a plurality of synchronization states and their corresponding scheduling modes at the access points, and configuring a decision condition of each synchronization state related to timing accuracy; and after the access points receive data packets of timing information distributed by the access point management unit, recovering the timing information and checking current timing accuracy, determining a current synchronization state in combination with the decision condition, and then performing uplink and downlink scheduling according to a scheduling mode corresponding to the current synchronization state.

Further, the scheduling method may have the following feature:

The synchronization states comprise a locking state, a free oscillation state and at least one intermediate state, and timing accuracy corresponding to the intermediate state is between the locking state's and the free oscillation state's;

When the access point determines that the current synchronization state is the locking state in which the timing accuracy meets requirement, it performs the normal uplink and downlink scheduling;

When the access point determines that the current synchronization state is the free oscillation state in which the access points cannot operate normally and there are neighbor cells, it shuts down a transceiver, while maintaining normal operation of a link between the access point and its access point management unit; and When the access point determines that the current synchronization state is the intermediate state and there are neighbor cells, it labels the last N (N=1, 2, 3 . . . ) symbols as unavailable in the uplink.

Further, the scheduling method may have the following feature:

The intermediate state is divided into at least a first state and a second state, and the second state is a state after the first state is maintained for a preset period;

When the access point determines that the current synchronization state is the first state and there are the neighbor cells, it labels the last one or more symbols as unavailable in the uplink and performs normal scheduling in the downlink; and When the access point determines that the current synchronization state is the second state and there are the neighbor cells, it labels the last N symbols as unavailable in the uplink and sets the maximum transmission power as a derating state in the downlink.

Further, the scheduling method may have the following feature:

When the timing accuracy is determined to greater than or greater than or equal to a timing accuracy threshold, or after the second state is maintained for another preset period, the access point enters into the free oscillation state.

Further, the scheduling method may have the following feature:

The layered wireless access system is a WiMAX time distribution duplex system, and the access point is a pico-base station, i.e., Pico BS, N=1.

Further, the scheduling method may have the following feature:

When the access point is started up, power-up self-checking and normal starting-up process of a minimal system without a transmitter is performed, and then the current synchronization state is checked and labeled according to convergence situation of a timing algorithm at a timing client; and Afterwards, the access point periodically checks and updates the synchronization state, and updates and performs a scheduling strategy according to the checked current synchronization state.

Further, the scheduling method may have the following feature:

The access point management unit is a master access point management unit having access gateway function, and communication cables or power lines are used as transmission media between the master access point management unit and its linked access points; or The access point management unit comprises a master access point management unit having access gateway function and one or more slave access point management units connected to the master access point management unit, the master access point management unit and slave access point management units which are connected directly to the linked access points have power line modulation and demodulation function, and power lines are used as transmission media for the linked access points which are directly connected.

Further, the scheduling method may have the following feature:

The access point reports the synchronization state to its master access point management unit, and the master access point management unit notifies its linked access points of neighbor cell information of each access point, the neighbor cell information comprises whether there are neighbor cells and synchronization states of the neighbor cells.

Still another technical problem to be solved by the present invention is to provide a distributed network management system in a layered wireless access system so as to control most flow within a local area network, thus saving network management and transmission bandwidth.

In order to solve the above technical problem, the present invention provides a distributed network management system in a layered wireless access system, and the distributed network management system comprises a network element management system and a network management center.

An access layer network element managed by the network management system is based on a layered structure and comprises a master access point management unit located in an access layer and its linked access points, and the network management system comprises a first network management agent module resided in the master access point management unit and a second network management agent module resided in an access point.

The first network management agent module is configured to interact with the network element management system and its linked access points to achieve network management function of the master access point management unit and its linked access points.

The second network management agent module is configured to interact with the access point management unit to achieve network management function of the access point.

Yet another technical problem to be solved by the present invention is to provide a distributed network management method in a layered wireless access system so as to decrease loads of a network element management system and backbone network, while improving performance and reliability of network management.

In order to solve the above technical problem, the present invention provides a network management method based on a network management system so as to achieve partial network management function at sides of a master access point management unit and access points, and the master access point management unit exchanges network management information with with a network element management system to achieve network management function for the master access point management unit, meanwhile, the master access point management unit exchanges network management information with its linked access points to achieve network management function for its linked access points.

Further, the network management method may have the following feature:

The network management comprises software version management and maintenance which comprise one or more of the following processing operations:

At the master access point management unit and each access point, their system configuration data is stored in the form of a file, import and export operations are performed on the file, and a copy of the file is stored in the network element management system.

Operation and maintenance staff configure and update the master access point management unit and/or the access points, and upload the new formed configuration file to the network element management system.

The operation and maintenance staff upgrade a version of the master access point management unit and/or the access point system remotely, the network element management system sends content of a new version to a target master access point management unit in an unified way and controls version distribution and activation procedures, and then the master access point management unit sends the content of the new version related to the access points to its linked access points.

The operation and maintenance staff use a virtual private network to access a network element management system client or directly check system configuration of the master access management unit at the network element management system client, and update the system configuration.

Two system versions are stored in the master access point management unit, which automatically returns to the previous available version when the remote update fails.

Further, the network management method may have the following feature:

The network management comprises performance statistics which comprises one or more of the following processing operations:

The master access management unit collects operation condition of service wireless resource of its linked access point system in real time, dynamically observes and tracks system resource and user service usage situation.

The master access management unit checks application situation of RF resource at a access point, and checks and updates RF transmission power.

The master access management unit automatically analyzes data according to the operation condition of the wireless resource in performance statistics data, and sends a system capacity alarm notification to the network element management system if overload and congestion of wireless resource utilization ratio occur in an access point in continuous periods.

Further, the network management method may have the following feature:

The network management comprises alarm information processing which comprises one or more of the following processing operations:

The master access management unit collects system operation condition information of its linked access points in real time, and records abnormal information in a file and uploads abnormal data to the network element management system when abnormality is detected; the network element management system diagnoses system errors according to the related alarm and abnormality report information.

A filter with alarm screening function is provided between the master access management unit and the network element management system to screen non-urgent alarm information into the master access management unit for storage, and only important alarm options are reported to the network element management system.

The network element management system polls the master access management unit in the designated area, which reports failure information in the specified time.

Still another technical problem to be solved by the present invention is to provide a frequency assignment method in a layered wireless access system so as to achieve the frequency automatic configuration and management with the aid of a master access point management unit.

In order to solve the above technical problem, the present invention provides a frequency assignment method in a layered wireless access system which comprises an access point management unit located in an access layer and its linked access points. The frequency assignment method comprises:

after starting up and operating normally, the access points applying for frequency point resource from their access point management unit;

the access point management unit determining a candidate frequency point for each access point based on adjacent relationship between each access point and sending it to the corresponding access point; and the access point checking signal quality of its own candidate frequency point after receiving the candidate frequency point, notifying the access point management unit to reselect a frequency point if the checking is rejected and returning to the previous step, and entering a normal operation process if the checking is accepted.

Further, the frequency assignment method may have the following feature:

When the access point starts up, power-up self check and normal start-up of the minimal system are firstly performed, and then a handshake authentication process of the access point management unit is initiated to apply for legal frequency point resource; a receiver is turned on to perform received signal strength indication (RSSI) signal detection after the candidate frequency point sent by the access point management unit is received, and the checking is determined to be accepted if an interference signal at the candidate frequency point is smaller than or smaller than or equal to a preset threshold, otherwise, the checking is determined to be rejected.

Further, the frequency assignment method may have the following feature:

When the access point management unit constructs a network using a partially used subchannel (PUSC) segment mehtod, it selects the candidate frequency point and segment for the access points by: firstly obtaining a list of neighbor cells of each access point, selecting a access point with the simplest neighbor cell relationship, randomly selecting the frequency point and segment for the selected access point, then selecting a frequency point and segment for the access points in the list of the neighbor cells, and finally assigning different frequency points and segments for the adjacent access points which interfere with each other. The candidate frequency point and segment are selected for each access point in turn in the same way.

Further, the frequency assignment method may have the following feature:

When there is a new added access point, the access point management unit obtains information of a neighbor cell frequency point of the new added access point and selectable frequency point resource according to a neighbor cell relationship table of the new added access point, and selects a frequency point different from the neighbor cell frequency point of the new added access point.

Further, the frequency assignment method may have the following feature:

When the access point management unit constructs a network using a partially used subchannel (PUSC) all subchannel method, it selects the candidate frequency point for the access points by: obtaining a list of neighbor cells of each access point, selecting a access point with the simplest neighbor cell relationship, randomly selecting a frequency point and segment for the selected access point, then selecting the frequency point and segment for the access points in the list of the neighbor cells, and finally assigning different frequency points and segments for the adjacent access points which interfere with each other. The candidate frequency point and segment are selected for each access point in turn in the same way.

Further, the frequency assignment method may have the following feature:

The access point management unit stores frequency point information of its linked access points, and after one of the linked access points becomes abnormal and restarts up, stores and feeds back its historical frequency point information to the access point.

To sum up, the technical scheme in accordance with the present invention comprises the following technical advantages.

It supports a layered network management architecture and provides a mechanism in which AGW-Lite is integrated into a BMU, thereby greatly improving system expandability and network performance and being beneficial to large scale network establishment. Layered transmission of network management information and local routing of internal information of the linked access points of the BMU and most flow are controlled within a local network such that network management and transmission bandwidth is saved. This improves the experience of user visiting internal resource in a coverage area, including access delay, handoff delay and jitter, and requirement for transmission is lowered.

A flexible interface and media form can be used between the access points and the BMU to support a BMU+Pico BS architecture, in which several media, such as a twisted-pair, optical fiber and power line, are flexibly accessed, and is suitable for different application scenarios and is beneficial to project deployment and fast network construction using preferably the power line as transmission media. When a power line based access point is used, a passive distributed antenna system can be deployed nearby, without adding a trunk amplifier and modifying a filter.

A ToP clock distribution mechanism based on the BMU layered architecture can be used, and the access points share a GPS clock configured by the BMU. Timing information transmitted through the twisted pair, cable, optical fiber, and even the power line is supported, and the timing information is recovered at the access points, without configuring a GPS module or installing an antenna for each access point, thereby reducing project difficulty and cost and decreasing the operator's CAPEX and OPEX.

Due to the uncertainty caused by interference signals in a power line system, the present invention is able to implement adaptive intelligent scheduling mechanism for the system according to link condition and recovery quality of timing signals to ensure system robustness and greatly improve system environmental adaptability and system availability.

Centralized agent function of local network management can be achieved in a layered master BMU to facilitate system maintenance and improve system maintainability, reliability and expandability through distributed network management.

A dual homing mechanism based on the AGW-Lite and centralized ASN-GW can be provided to guarantee system reliability; an indoor coverage Pico BS belongs to a AGW-Lite in normal condition, and it automatically switches to the centralized ASN-GW in abnormal condition;

The BMU supports load monitoring and management of its linked Pico BSs, configures a PUSC Segment networking manner during the initial stage of network construction, and is able to smoothly upgrade to the PUSC All Subchannel to support system capacity expansion.

THE PREFERRED EMBODIMENTS OF THE PRESENT INVENTION

The present invention will be described in further detail in combination with the accompanying figures and the preferred embodiments. It should be noted that, although a WiMAX system is taken as an example in the following description, the present invention is not merely applied to the WiMAX system, it is also applied for other OFDMA (Orthogonal Frequency Division Multiple Access)-based TDD and FDD systems, such as LTE (Long Term Evolution), TD-SCDMA (Time division Synchronous Code Division Multiple Access) and UMB (Ultra Mobile Broadband), and is also widely suitable for all wireless indoor coverage technologies. The applicable scenes including coverage limited scene and capacity limited scene flexibly implement smooth upgrade from initial coverage limitation to late capacity limitation and protect the existing device investment; moreover, the maintenance and upgrade are only implemented at a concentration point of the BMU, thereby decreasing maintenance cost.

Before the discussion of the present embodiment, there are several concepts are needed to be made clear.

Since the main coverage area is indoors, an access point, which is a WiMAX base station in this embodiment, mainly uses as a Pico BS; however, a base station of other systems or other types of access point can be used.

An access point management unit, also called as a Building Management Unit (BMU) in the present invention, does not belong to the existing building management system, is specially used as a centralized management function entity of the indoor Pico BSs and also integrated with function of a small capacity access gateway (Light ASN-GW, AGW-Lite for short).

Layered means that a WiMAX overall network deployment is divided into a CSN and ASN, and the ASN is further divided into several layers, such as a centralized ASN-GW, distributed AGW-Lite, base station and user equipment.

Power line transmission means a power line network which provides AC low voltage power supply (110VAC/220VAC) for room lighting, electrical appliances and aisles in a building.

First, the architecture of a WiMAX access network in accordance with the present invention is described below.

Figure 1:
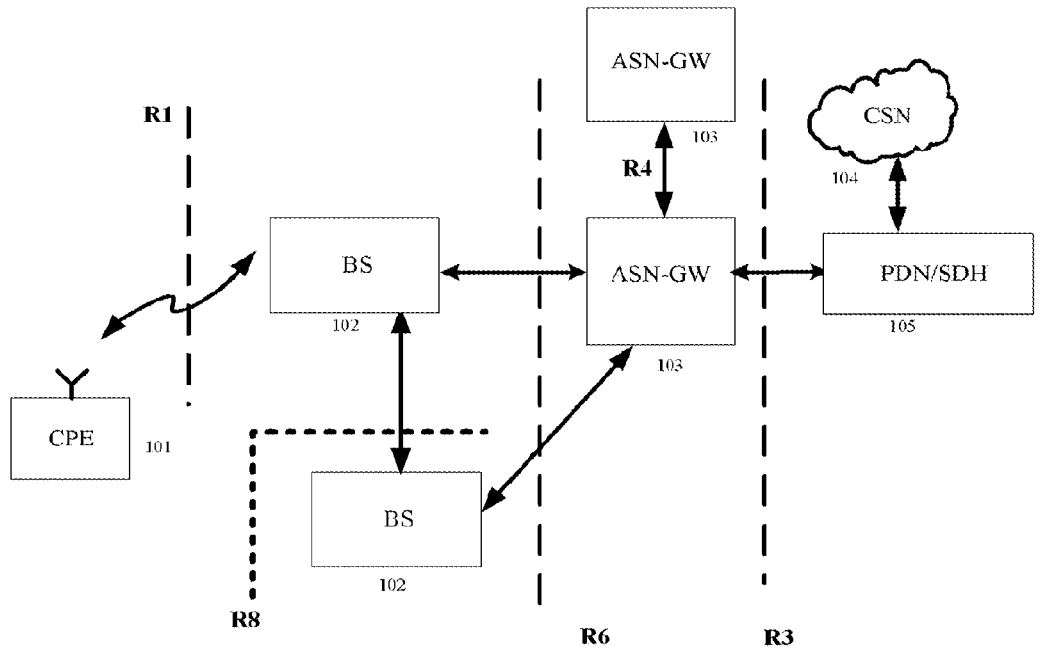
FIG. 1 is a schematic diagram of a WiMAX mobile network architecture.
Figure 2:
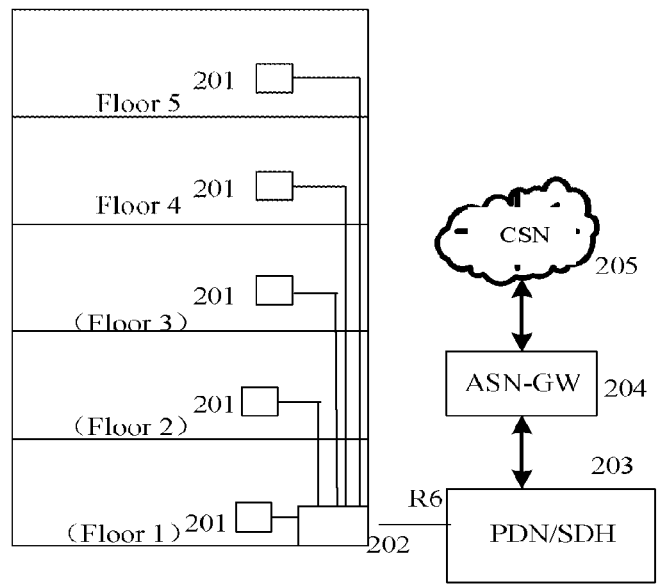
FIG. 2 is a schematic diagram of an indoor coverage network based on the conventional Pico BS architecture.
Figure 3:
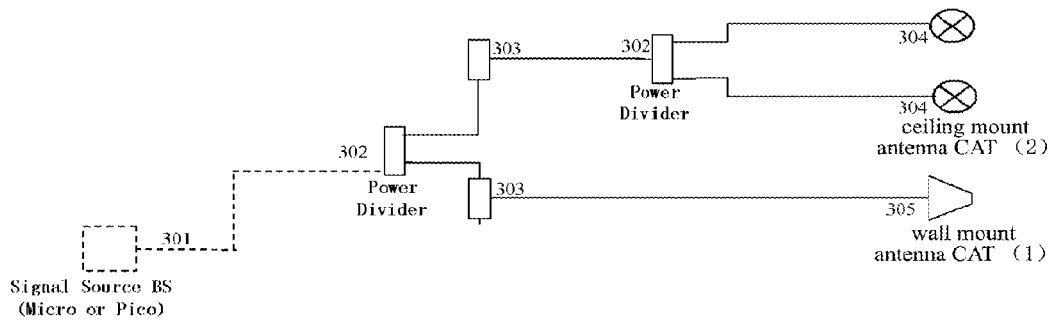
FIG. 3 is a schematic diagram of an indoor coverage network based on a signal resource base station+distributed passive antenna system architecture.
Figure 4:
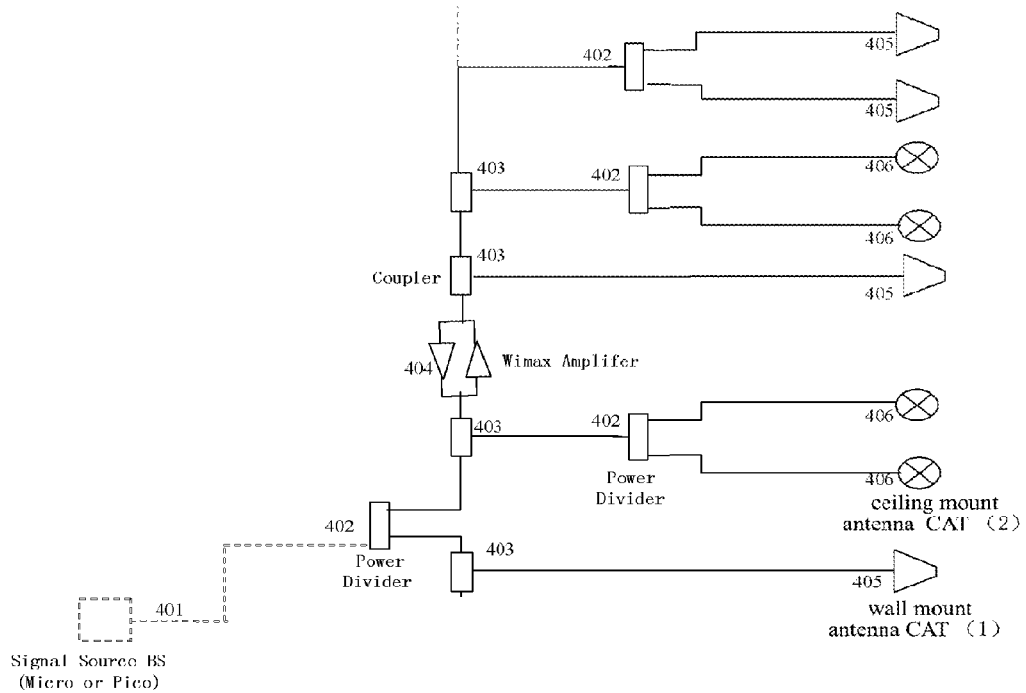
FIG. 4 is a schematic diagram of an indoor coverage network based on a signal resource base station+distributed active antenna system architecture.
Figure 5:
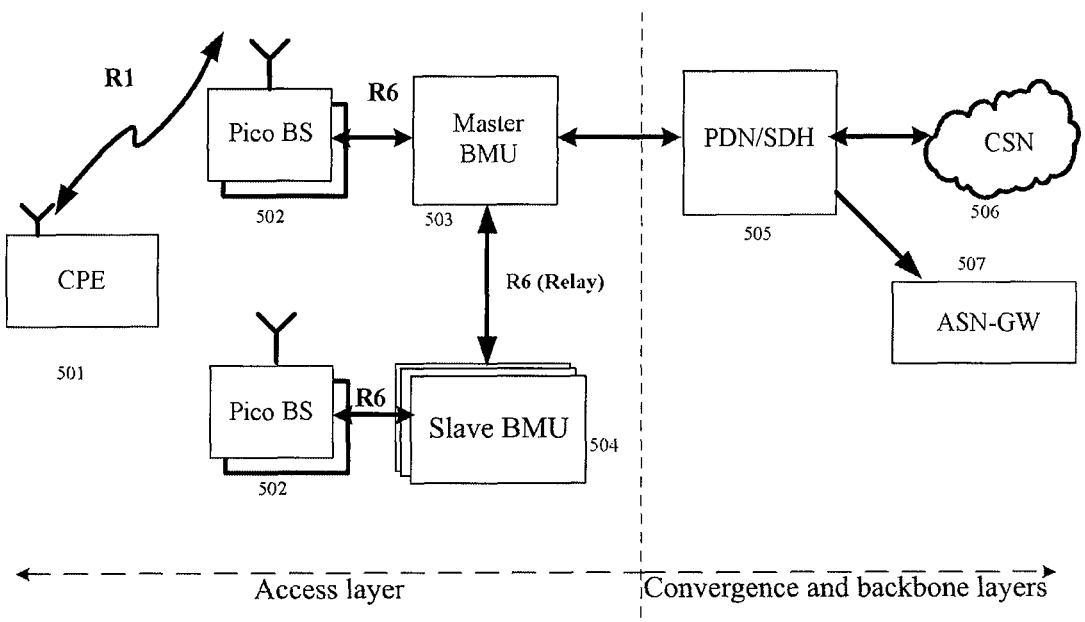
FIG. 5 is a schematic diagram of a WiMAX network structure based on a BMU layered architecture in accordance with an embodiment of the present invention.

FIG. 5 is a WiMAX access network based on a BMU layered architecture in accordance with the present invention. It is mainly applied for an indoor coverage scenario in the present invention, and is also applied for an indoor-outdoor-combined coverage scenario in local areas. However, the following description will focus mainly on the indoor coverage and a main type of base station, Pico BS.

As shown in FIG. 5, the ASN uses a layered architecture including four layers: a user terminal device—CPE 501, access points—Pico BSs 502, access point management units—BMUs and a centralized ASN-GW 507; where the BMUs is in turn divided into a master BMU 503 and a slave BMU 504, and network scale is expanded by supporting the slave BMU 504 to connect with the master BMU 503 through a cascade interface directly. A standard R6 interface is used between the Pico BS 502 and the master BMU 503 and slave BMU 504, an standard R3 interface (R3 is a logical interface, which is connected to the master BMU and CSN through SDH or PDN) is used between the master BMU 503 and the CSN 506, and an standard R4 interface (not shown) is used between a plurality of master BMUs 503 and between the master BMU and the centralized ASN-GW 507. The standard R6 interface is used between a plurality of slave BMUs 504 and between the slave BMU 504 and the master BMU 503. The slave BMU is optional. PDN/SDH 505, CSN (Connection Service Network) 506 and the centralized ASN-GW 507 are network elements in collective and backbone layers.

Figure 7:
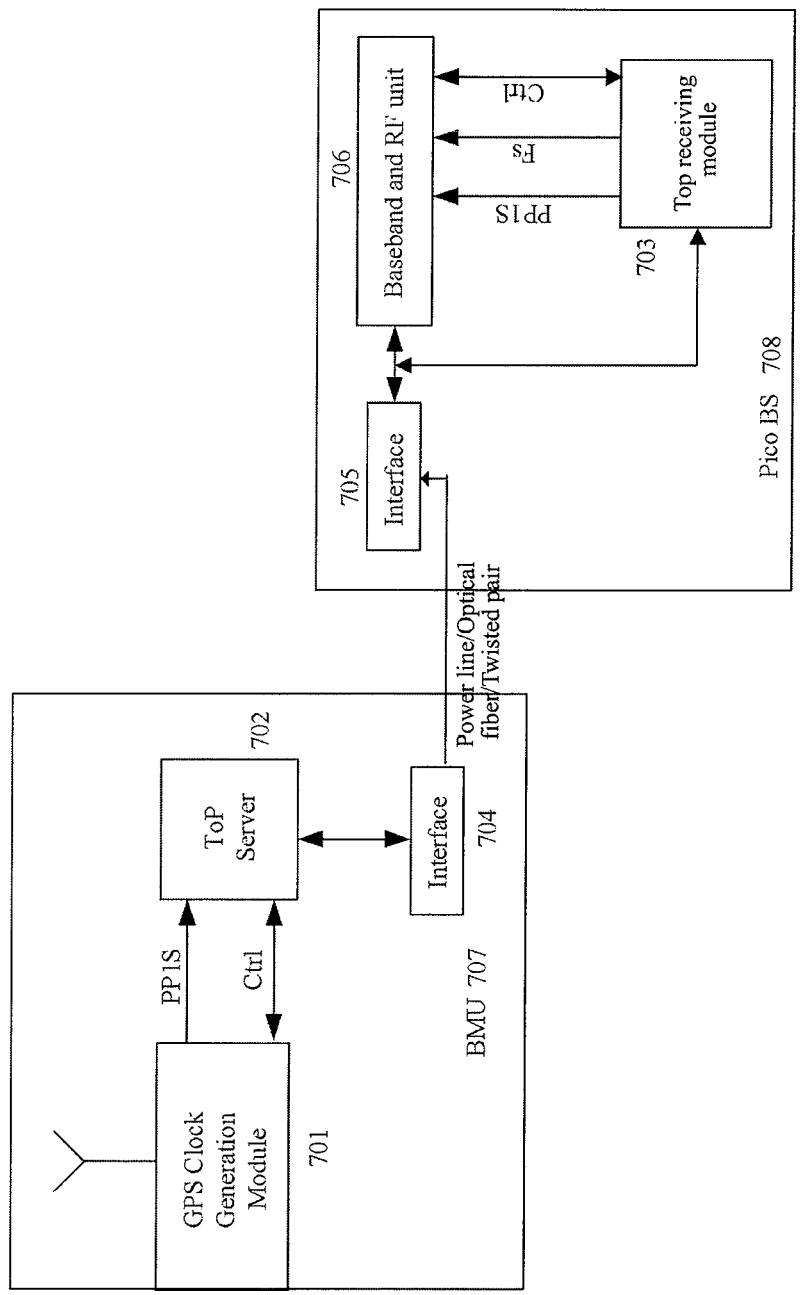
FIG. 7 is a schematic diagram of a timing subsystem which implements a timing mechanism between the BMUs and the Pico BSs.

A variety of networking forms, including a star networking, chain-shaped networking and tree hybrid networking shown in FIG. 7, are flexibly supported between the master and slave BMUs. Communication cables, such as the optical fiber, twisted pair and coaxial cable, are used between the master BMU and slave BMU as transmission media in the present invention. Communication cables, such as the optical fiber, twisted pair, coaxial cable, and power line, are used between the master and slave BMUs and the Pico BS as transmission media.

Since the ASN-GW belongs to a centralized point and control node of protocol termination at a wireless access side, in order to achieve functions such as wireless resource management, handoff management, paging management and routing protocol processing of an IP network, a centralized deployment method, by which the ASN-GW is located in the collective and backbone layers, is generally used in the traditional schemes. The present invention proposes a layered deployment method in terms of the architecture of the network deployment, and in important indoor coverage areas, the BMU is near the base station deployment and uses the distributed architecture, and its installation position is in a access layer. The BMU integrates ASN-GW function modules with small and medium capacity (hereinafter referred to as AGW-Lite, in order to be distinguished from the centralized ASN-GW). The BMU processes and routes and forwards data of access points, and also performs network management for the access points. The present invention also considers requirements for seamless coverage and deploys the centralized ASN-GW in the collective layer or the backbone layer.

Whether the existing 2/3G network or the future 4G network will be used, indoors is always the important area where service flow occurs, and statistic data of NTT DoCoMo in the existing network shows that the indoor occupation rate is up to 70% in the user distribution. Moreover, behaviors of the corresponding indoor users are usually static or moving slowly. Data and control plane signaling interaction between the base stations managed by the same master BMU (including its cascaded slave BMU) is directly processed and forwarded by the BMU using a distributed method for deploying the AGW-Lites, without routing to the centralized CSN node. That is, terminating the WiMAX protocol in each access point building and directly connecting with an IP data network may considerably decrease capacity requirement for centralized deploying ASN-GWs.

The Intranet, important coverage buildings or group users are always the important areas in which service flow occurs, meanwhile, a large proportion of flows in Intranet users occur among the in-network users. According to data flow statistics of the internal intranet in Zhongxing Telecommunication Equipment, 50% of flows occur within the intranet. Network communication uses the layered BMU architecture and AGW-Lite deployment to terminate the WiMAX protocol in each access point building, and this portion of flows is digested within the AGW-Lite, reducing the stress for a transmission network. If the traditional centralized ASN-GW deployment scheme is used, the occupancy of transmission bandwidth and operating cost will increase by nearly 50%.

The present invention supports the Pico BSs which belong to both the AGW-Lite and the centralized ASN-GW, to improve system reliability. In default state, the Pico BSs belong to the AGW-Lite built in the BMU. In the case of AGW-Lite failure, the flow of the Pico BSs automatically identifies the failure through online R6 link detection and switches to the centralized ASN-GW.

Figure 6A:
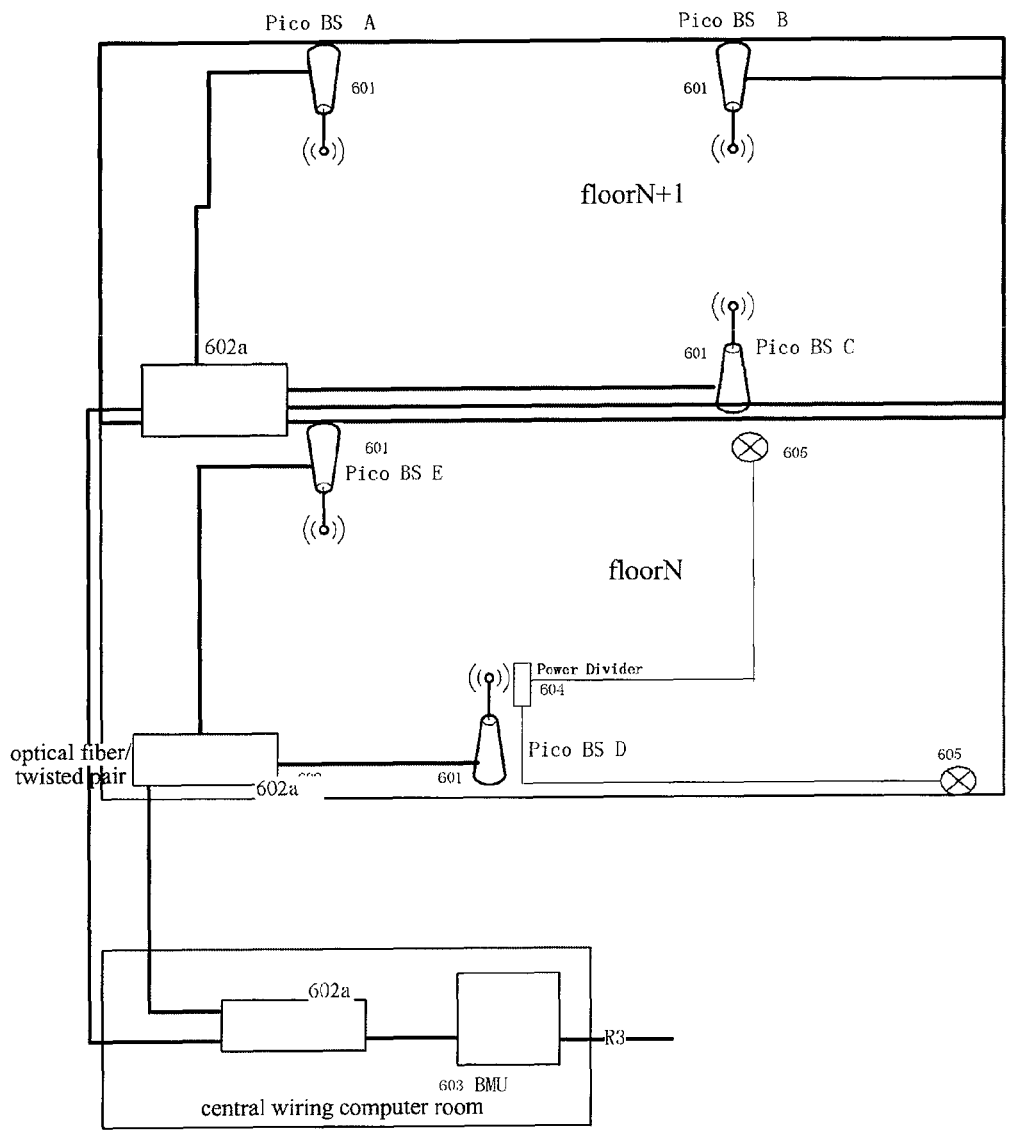
FIG. 6A is a schematic diagram of a WiMAX access point management system based on a twisted pair/optical fiber in accordance with an embodiment of the present invention.

FIG. 6A is a BMU deployment solution based on the twisted wire/optical fiber resource in a scenario that access points are available in accordance with the present invention. A WiMAX FDD system and other non-WiMAX wireless access systems can be implemented using the architecture in FIG. 6.

The wireless access system mainly comprises Pico BSs 601 and a centralized master access point management unit BMU 603. The Pico BSs 601 and the master BMU 603 are connected via LAN (including the switcher 602a) inside the building, and a standard R6 interface is used. A physical interface may be an electrical or optical interface with physical rate being 100 or 1000 Mbps. Bearing media may be optical fibers or twisted pairs. In this solution, only one BMU 603, the master BMU, is required to be configured, and the expansion between the networks can use a universal switcher, without configuring a slave BMU. BMU 603 generally deploys in the vicinity inside the building, such as a mansion, in which a WiMAX base station is located. However, this is only an example, the BMU can also be deployed in any area which is reachable for the linked access point cable resource. Moreover, for relatively small and adjacent buildings, one BUM can be provided in a number of buildings.

Figure 6B:
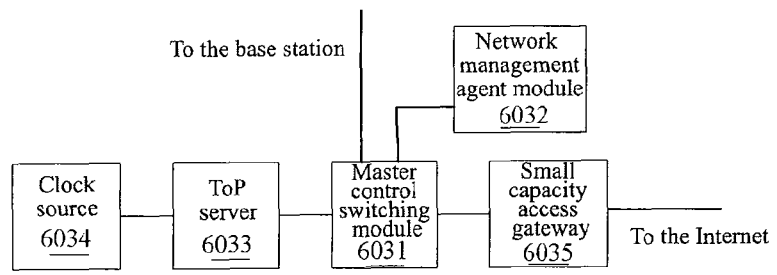
FIG. 6B is a schematic diagram of function modules in a BMU shown in FIG. 6A.

As shown in FIG. 6B, function modules in the master BMU comprise a master control switching module 6031, an access gateway function module 6035 connected to the master control switching module 6031, a timing over packet (ToP) server 6033, a centralized network management function module 6032, and a clock source 6034 connected to the ToP server 6033.

The master control switching module 6031 has a communication interface interacting with the linked access points of the access point management unit and/or other master control switching modules, and is configured to process and forward data (including user plane data, clock data, etc) and signaling interaction of the BMU's linked base stations. If a plurality of base stations are required be bound to form a logic WiMAX channel, the master control switching module performs centralized processing function of the MAC and layer 3 protocol of this logical channel.

The centralized network management function module 6032, also called as a network management agent module, is configured to perform the BMU's operation maintenance and information processing.

The clock source 6034 may be an inner GPS receiver, or other clock module may be configured in the BMU to replace the GPS receiving module to generate timing information, or the timing information may be generated by inputting an external clock source. That is, this module is optional.

The ToP server 6033, also called as a ToP server function module, is configured to distribute clock information to a plurality of ToP clients. Of course, the present invention may also use other timing servers.

The access gateway (AGW-Lite) function module 6035, also called as a small capacity access gateway, function of which is similar to that of the centralized access gateway, is optionally integrated in the master BMU 603, and is configured to complete the aggregation of base station access information and the processing of tunnel protocols and provide a R3 interface to a core network CSN and the interne, while providing route switching related information to a corresponding centralized access gateway. The AGW-Lite is also responsible for processing function of local wireless resource and self-routing function of local flow. The AGW-Lite also completes termination processing for its linked base station tunnel, flow shaping and flow control for a plurality of linked base stations, as well as data flow scheduling processing based on the base station.

In this case, the Pico BSs of the $N^{th}$ and $(N+1)^{th}$ floors may use either a PUSC (Partially Used Subchannel) Segment configuration method or a PUSC all Subchannels configuration method according to user traffic statistics and deployment. For coverage limited area, the network may be constructed using the PUSC Segment method, thereby improving spectrum use efficiency. A method of subchannel assignment between the Pico BSs can be automatically generated at the BMU side based on a relative position relationship between the Pico BSs, reducing the time for project launching and maintenance individually configured at each Pico BS, facilitating economical and fast network construction of the operators and decreasing the operators' OPEX (Operating Expense).

The present embodiment supports a plurality of physically separated Pico BSs which constitute a logic cell group, for example, it may be assumed that Pico BS A, Pico BS B and Pico BS C in FIG. 6 constitute logic cell group 1; Pico BS D and Pico BS E constitute logic cell group 2, and all the Pico BSs in one cell group share different subchannels of the same WiMAX channel, while different cell groups are assigned with different WiMAX channels. The BMU assigns the subchannels according to the position relationship between the linked Pico BSs in the cell groups 1 and 2, while guaranteeing that the interference between Pico BSs A~E is minimized.

For the coverage limited areas, the Pico base station can be used as a signal source, and the coverage range is expanded through a coupler or power Dividor 604 and a passive distributed antenna system 605. A RF cable may be connected between the coupler or power Dividor 604 and the passive distributed antenna system 605.

Figure 6C:
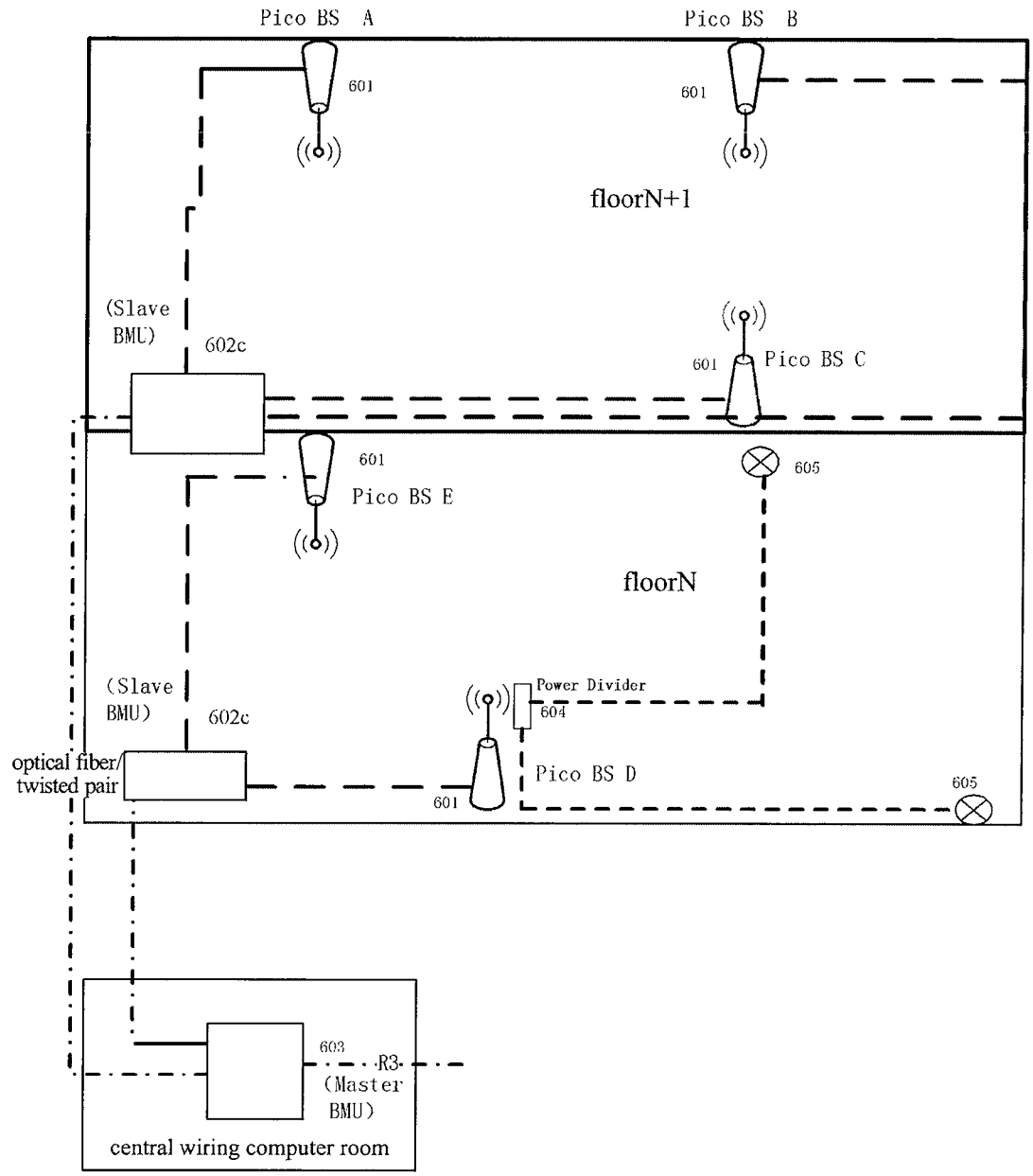
FIG. 6C is a schematic diagram of a WiMAX access point management system based on power line transmission in accordance with another embodiment of the present invention.

FIG. 6C is a schematic diagram of the BMU deployment in the case where a power line is used as transmission resource in the Pico BS scene in accordance with another embodiment, provides the possibility of power line based transmission between the Pico BS and the BMU, and forms a complementary solution for FIG. 6A, which is applicable to the case where wires can not be added to the planned Pico BS access point locations.

In this solution, a cascaded interface of the master BMU 603 is connected to a slave BMU 602c, which may in turn be connected to one or more BMU 602c, and of course, other star and tree networking forms can also be used. The slave BMU is used to implement power line transmission relay function as well as data and timing information routing forward function between the master BMU and the Pico BSs managed by the BMU. Various available transmission resource interconnections, such as the optical fiber or the twisted pair, are used between the master and slave BMUs. The power line is connected between the slave BMU and the Pico BSs managed by the BMU. Like the previous embodiment, this embodiment also supports a plurality of physically separated Pico BSs which constitute a logic cell group, which will not be repeated herein. If there are less linked access points, the slave BMU may not be configured, and the power line is used directly as transmission media between the master BMU and its linked access points.

Figure 6D:
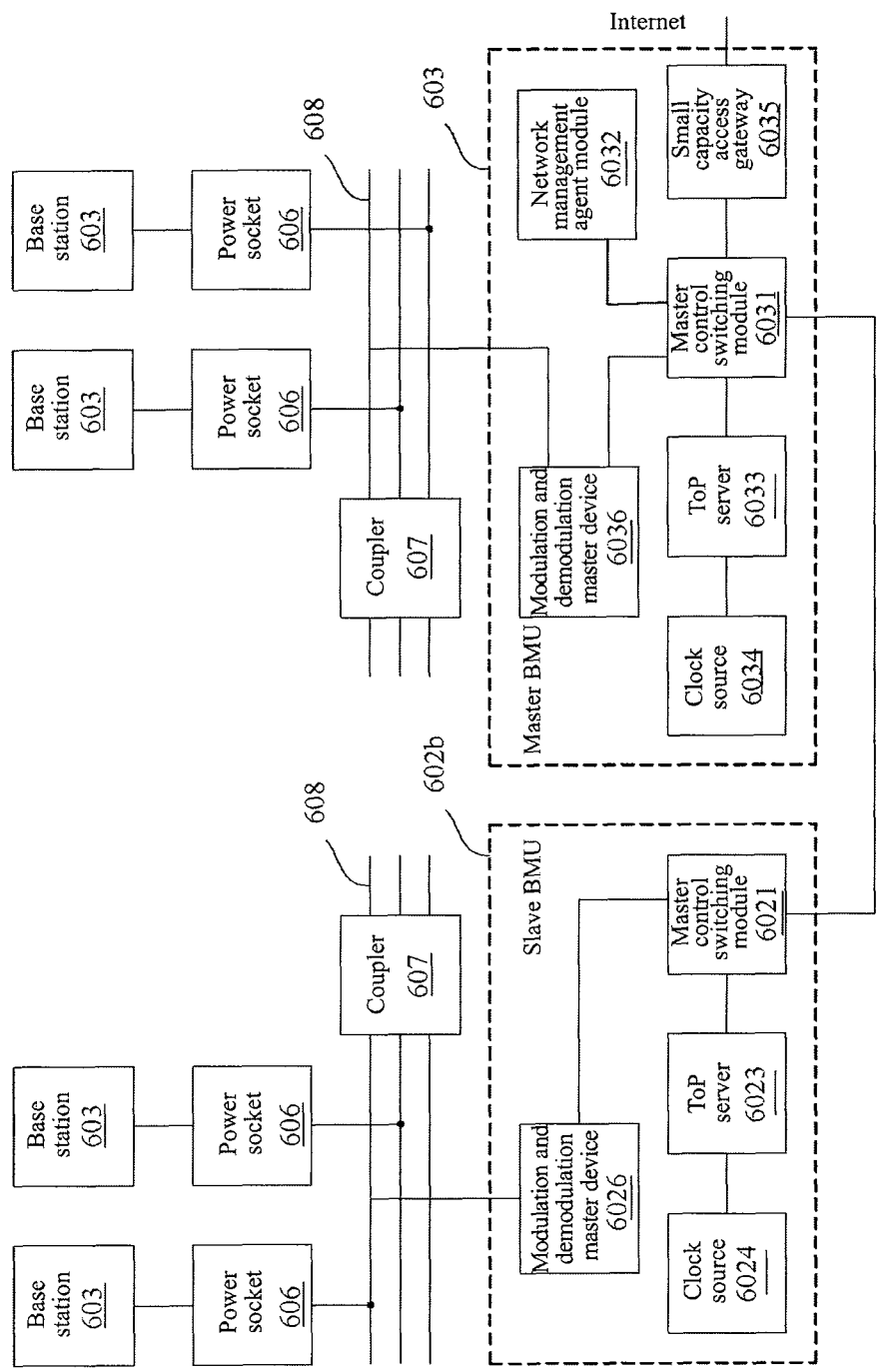
FIG. 6D is another schematic diagram of the WiMAX access point management system shown in FIG. 6B, and specifically illustrates module construction of master and slave BMUs, as well as a method of power line connection between the BMUs and the Pico BSs.

FIG. 6D is also the WiMAX access point management system in FIG. 6B, and specifically illustrates module construction of the master and slave BMUs, as well as the method of power line connection between the slave BMU and the Pico BSs. Pico BSs 601 may be installed nearby a power socket 606, and data transmission and power supply between the BMU and Pico BSs are born in a power line 608. Considering the complexity of indoor power line deployment, different phases may be connected in different rooms and floors, and three phases in the same transformer are coupled using a coupler 607 to facilitate fast and simple project deployment.

Function modules configured in the master BMU comprise the master control switching module 6031, the small capacity access gateway 6035 connected to the master control switching module 6031, the ToP server 6033, the network management agent module 6032, a power line transmission interface module 6036 and the clock source 6034 connected to the ToP server 6033. Compared with the master BMU in FIG. 6B, i.e., the BMU in the previous embodiment, the power line transmission interface module 6036 is added. The module 6036 is implemented by a modulation and demodulation master device and is connected between the master control switching module and the power line, is configured to complete power line transmission function, link detection and adaptive processing function and provides a synchronization state to the master control switching module as the basis of subsequent processing. Moreover, cascade function is required to be added between the master control switching module 6031 and the BMU on the basis of the previous embodiment. The ToP server may also be configured to receive synchronization state information sent by each ToP client and distribute neighbor cell synchronization state information to each ToP client. Other module functions may be found in the previous embodiment.

Compared with the master BMU 603, the slave BMU 602c does not comprise the network management agent module 6032 and the small capacity access gateway 6035, that is, its configured function modules only comprise the master control switching module 6031, the ToP server 6033 connected to the master control switching module 6031, and the power line transmission interface module 6036, and optionally, the clock source 6034 connected to the ToP server 6033. Each module function may be found in the section described for the master BMU.

Based on the above network architecture, a synchronization method in accordance with the present invention will be described in detail below.

In order to decrease the Pico BS's requirement and cost for installation and maintenance, a GPS clock generation module, such as a GPS receiver, is configured at the BMU side in this embodiment to generate PP1S (industrial signal measurement converter) timing information. By configuring the GPS module in the BMU, instillation difficulty and cost for configuring the GPS receiver at the Pico BS side are decreased, thereby facilitating fast networking, reducing initial investment and decreasing maintenance cost. The generated timing information is distributed to each Pico BS through the Ethernet packets, and then the Pico BSs recover the timing information. Specifically, in the scenario where power line based transmission is used between the BMU and the base station, ToP timing information sent by the ToP server is transmitted to the Pico BSd through the master control switch and the modulation and demodulation master device. In the scenario where optical fiber or twisted pair based transmission is used between the BMU and the base station, the ToP timing information sent by the ToP server is transmitted to the Pico BSs through the master control switch and a switch.

FIG. 7 is a schematic diagram of a timing subsystem which implements a timing mechanism between the BMU and Pico BSs. BMU 707 comprises a GPS clock generation module 701 and a ToP server 702 connected to the GPS clock generation module 701. The ToP server module is connected to the Pico BSs through a network interface 704 at the BMU side. The Pico BS 708 comprises a network interface 705, a ToP receiving module (or referred to as a ToP client) 703 and a baseband and RF unit 706 which connect with each other at the Pico BS side.

The GPS clock generation module 701 is used as timing reference of the whole system and outputs a timing reference signal to the ToP server 702, where the timing reference signal comprises a PP signal and other related information (e.g., TOD, location information, etc.).

The TOP server 702 generates a hardware time stamp based on the timing reference signal, and sends ToP timing information packets to the Pico BSs through network interfaces 704 and 705 at the BMU side and Pico BS side, respectively, according to address information of each Pico BS.

The TOP receiving module 703 estimates jitter and delay and recovers a timing signal according to the timing information packets received from the network interface 704 at the Pico BS side, and outputs the timing signal to the baseband and RF module as the timing reference signal of the baseband and RF module 706.

In FIG. 7, Fs represents sampling frequency; PP1S represents second pulse signal; Ctrl represents control information, such as locking state and link state of the ToP module.

The above timing recovery mechanism decreases the installation difficulty and cost for configuring the GPS receiver at each base station side, thereby facilitating fast networking, reducing initial investment and decreasing maintenance cost.

Further, this embodiment may use one or more of the following optimized measures for the ToP synchronization method.

Network QoS (Quality of Service) guarantee:

In order to guarantee that clock recovery performance at the ToP receiving module side is in a stable and optimized state, when a QoS default strategy is set at an EMS (Element Management System) server, message priority related to ToP information is set to be the same as message priority of real-time data or to be the highest priority, and is synchronized to the BMU side and the Pico BS side to guarantee statistically that both the delay and jitter are within a rational range. The timing information is labeled as the designated QoS type in the ToP module (including the ToP server and the ToP client), a QoS label information based scheduling strategy is performed at the BMU and base station sides, and the timing information is distributed and routed according to real time service requirements. By setting the guaranteed uplink and downlink bandwidth of each Pico BS by a network manager, sufficient bandwidth for transmitting reliably the ToP information is guaranteed. Meanwhile, a dedicated hardware co-processer can be used for extraction and processing in the Pico BS so as to decrease uncertain delay and influence brought by software.

The convergence speed of the optimized ToP:

At present, the IEEE1588 convergence speed is influenced greatly by network load, therefore, the following scheduling mechanism is considered to be used for optimization of the TOP convergence speed. The following means is mainly used: when powered-up and initialized, the TOP server synchronization packets in the form of the shortest packet at the BMU side are sent in a broadcast mode in a subnet. For such messages, a processing strategy of the BMU's master control and switch module is in preference to all the other services. Meanwhile, for the designated Pico BS nodes, a flow control mechanism is selectively activated as long as the BMU side is not synchronous with the Pico BS nodes, so as to reduce the jitter and delay caused by non-control plane information congestion as far as possible, guarantee reliable transmission of the ToP information, and ensure that the network load is within the rational range (60%~70%) during the initial synchronization of the TOP server, that is, there is no influence from a network burst message or network congestion; after the synchronization, the BMU and Pico BSs send the data packets according to the normal operation procedure.

Synchronization process mechanism of the newly added SLAVE nodes:

In an initial access state, only basic ToP information message and state configuration information are transmitted between SLAVE nodes of the Pico BSs which are newly added to the network and the master BMU, and media plane data is not transmitted and born, to ensure that the congestion will not occur and to accelerate the synchronization process. The BMU side controls whether the base station can be normally powered up and started up according to feedback situation of synchronization state information of the Pico BSs and establishes a media flow channel. The master BMU adjusts sending frequency of ToP information messages and optimizes synchronization performance when bandwidth occupancy rate of transmission data of all nodes is lower than a preset threshold based on the synchronization performance of all the nodes in the subset.

Algorithm optimization using digital synchronization phase-locked loop:

Loosely coupled phase-locked loop, narrowband loop and adaptive filter algorithms are used to filter out jitter and drifting in the Ethernet; an adaptive maintaining HOLDOVER algorithm is used to automatically check network synchronization quality. When the network quality deteriorates, a HOLDOVER state is automatically entered. The HOLDOVER algorithm automatically memorizes control parameters in the case of optimal synchronization performance using a learning and training method. The control parameters are refreshed using the memorized in the HOLDOVER state to enable the system to achieve perfect maintenance performance.

Network management and processing mechanism of the synchronization performance:

Since the WIMAX system has very high requirements for network synchronization performance, if a certain node is asynchronous, the interference to the whole network will be increased due to time sequence disorder of the TDD, and the performance will sharply deteriorate. Therefore, the system controls a means for monitoring the synchronization state of each node in real time, and when the network management front desk agent detects that the synchronization performance of a node decreases, it will use an abnormality processing mechanism for this node to decrease transmission power of this node and reduce an area coverage radius. Thus, the interference to neighbor cells may be decreased. If the network synchronization performance is not yet recovered in the specified time, the base station RF output will be automatically shut down to warn a back stage in order to notify relevant personnel to solve the problem.

Moreover, the BMU may initiate an initialization procedure for abnormal nodes in the subnet at idle time (e.g., before dawn) to accelerate the synchronization recovery process.

A flow control mechanism will be described in detail below.

In order to effectively implement synchronization management for the base stations, neighbor cell information of the linked base stations, TTG (Transmit Transition Gap) and RTG (Receive Transition Gap) default parameters, base station derating power default parameter, etc., all of which are sent to the base stations by the BMU, are required to be resided and stored locally in the BMU. Synchronization state information is periodically updated between the BMU and the base stations in order for the linked base stations of the BMU implement effective and reliable scheduling and processing uniformly. The BMU assists the base stations to implement the dynamic scheduling and configure uniformly the TDD uplink and downlink proportion and RTG/TTG time sequence parameters for the base stations. In normal condition, the base stations use a universe scheduling mechanism.

Figure 8A:
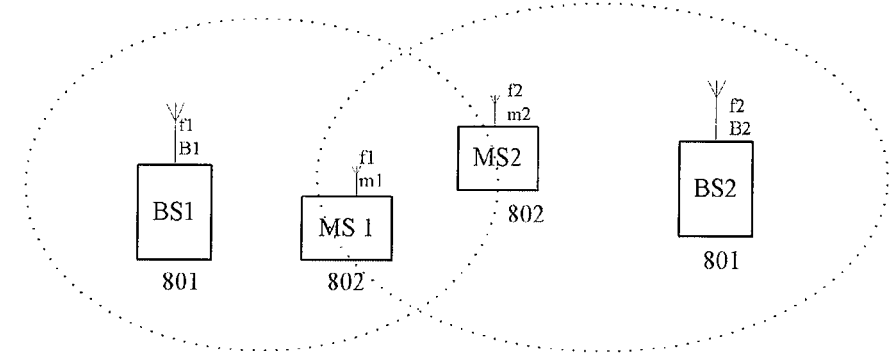
FIG. 8A is a schematic diagram of networking of adjacent base stations in accordance with an example of the present invention.

As shown in FIG. 8A, BS1 and BS2 are two adjacent indoor base stations. Considering that the interference to neighbor cells in the same frequency networking cannot be avoided, different frequency networking is recommended. Assuming that each base station operates at different frequencies, for example, BS1 operates at f1, BS2 at f2; MS1 and MS2 are two terminal users in the adjacent areas, MS1 is connected in BS1 and MS2 is connected in BS2. If BS1 and BS2 are asynchronous or their synchronization accuracy is relatively low, it is possible that signal interference between the adjacent base stations or even interference between the terminals may occur, resulting in the system being unable to operate normally.

There are two types of interferences:

(1) Spurious interference among adjacent devices, which results in the decreased sensitivity of the adjacent base stations;

(2) Strong interference among the adjacent devices, which results in congestion in the receiver due to nonsynchronization between the devices.

The specific interferences may be subdivided into the following cases:

(1) Downlink interference caused by the BS1 for the MS2;
(2) Uplink receiving link interference caused by the BS1 for the BS2;
(3) Downlink interference caused by the BS2 for the MS1;
(4) Uplink receiving link interference caused by the BS2 for the BS1;
(5) Transmitting/receiving interference between the MS1 and MS2.

According to analysis of various situations of networking, the 802.16e RCT test specification demands that timing accuracy of the adjacent base stations reach +/−1 µs, which requires that all the base stations must be configured with GPS receivers. However, for an indoor coverage scene, it is very difficult to deploy GPS receivers and antenna systems in all the base stations. The particular situation of the indoor coverage scene is analyzed: multipath transmissions are relatively abundant for an indoor coverage system, but multipath delay is generally smaller and is typically less than 5 µs when the indoor coverage radius is not larger than 100 m. According to the RCT test specification, RTG is set to be 60 µs and TTG 105.7142857 µs for a 5/10 MHz system such that timing accuracy requirement for the indoor coverage base stations can be decreased appropriately, for example, decreased to +/−20 µs at least.

Figure 8B:
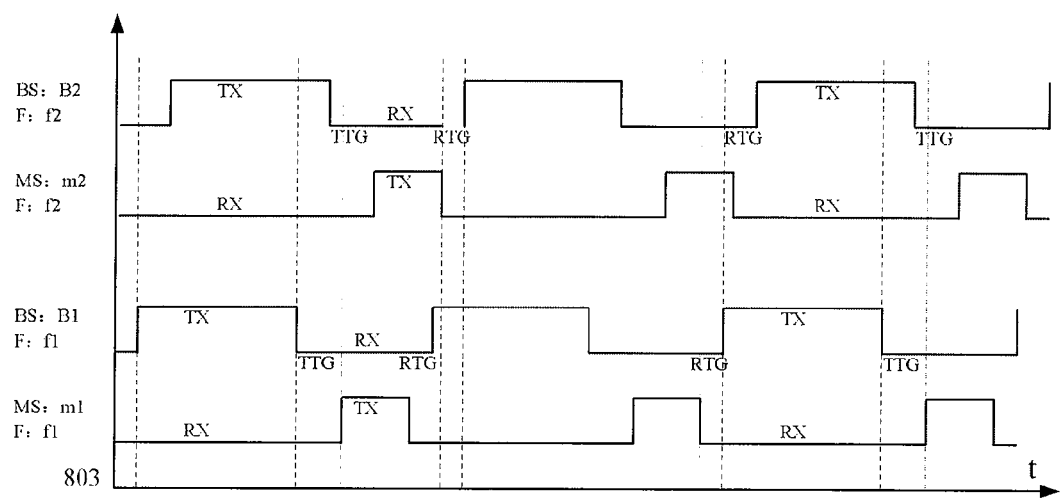
FIG. 8B is a schematic diagram of accuracy requirement definition of an indoor coverage system based on power line transmission.

In the case of the accuracy requirement of +/−20 µs, a ToP method can be used to transmit and recovery the timing information between the BMU and base stations. In the case where the ToP timing information is transmitted based on the Ethernet, the system timing may reach the accuracy of +/−(1~5) µs, and when the link quality deteriorates, it may be within the range of +/−20 µs such that requirements for system performance and networking can be satisfied. In the case where the ToP timing information is transmitted based on the power line, the system performance is relatively complicated, and in the case where the link is normal, the timing accuracy may reach +/−20 µs, and when the link quality deteriorates, it may be within the accuracy range of +/−(30~50) In this case, the system may not operate normally when RTG specified by the RCT is 60 µs. As shown in FIG. 8B, although BS1 and B2 use different frequencies, considering the design principle of pre-filters of the base stations, especially when an operator possesses a continuous spectrum, the filters in the BS1 and BS2 will use broadband filters with continuous bandwidth, and the uplink of the MS2 may cause inband interference to BS1 and may significantly decrease receiving sensitivity of the system in serious case.

Figure 9:
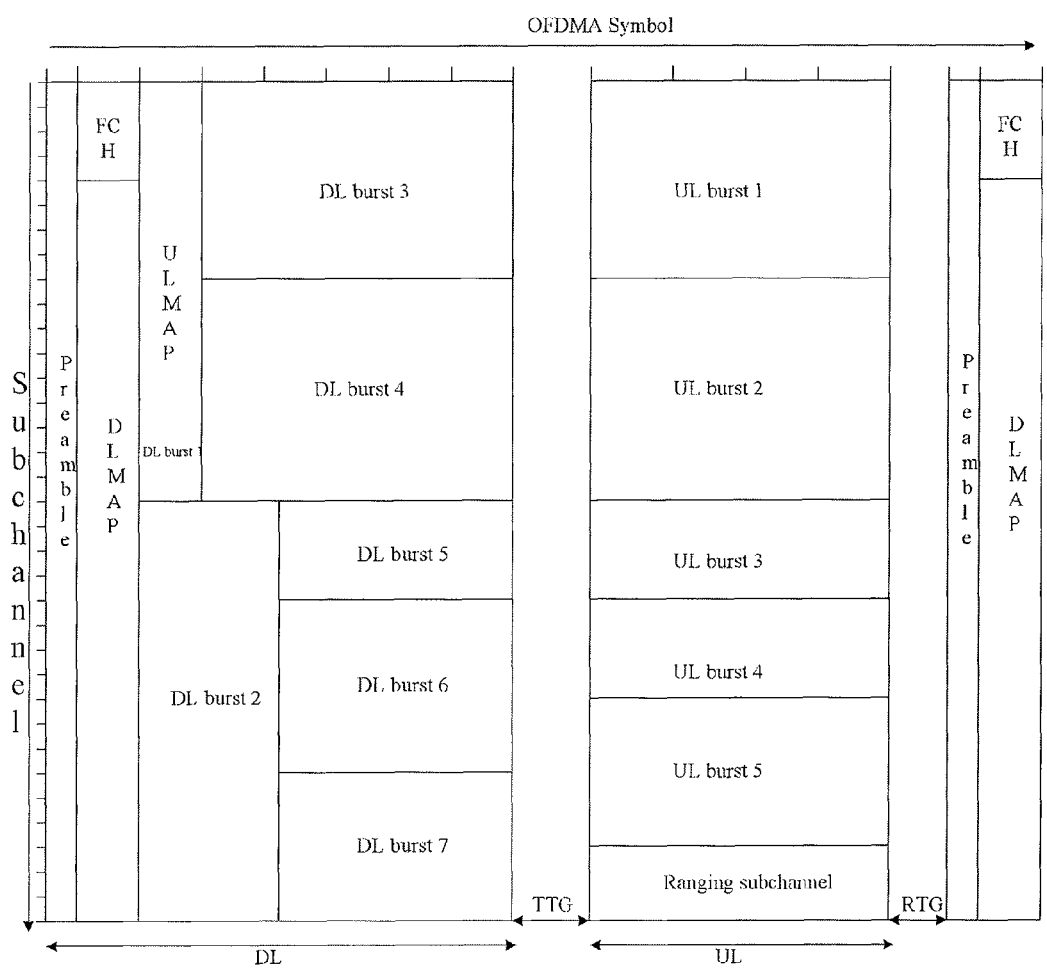
FIG. 9 is a schematic diagram of a frame structure based on an 802.16e WiMAX TDD system.

FIG. 9 is a schematic diagram of a frame structure based on an 802.16e WiMAX TDD system. The frame format is defined according to two dimensions, time and frequency (subcarrier). According the time dimension, typically, the frame length may be defined optionally to be 2 ms, 5 ms or 10 ms in the 802.16e protocol. According to different channel bandwidths (such as 5 MHz, 10 MHz, etc.), there are different definitions for the number of subcarriers (512 subcarriers correspond to the bandwidth of 5 MHz, and 1024 subcarriers to 10 MHz). A subchannel group is composed of the subcarriers according to a certain replacement mode, and one subchannel contains a certain number of subcarriers, for example, for 10 MHz, one downlink subchannel contains 24 data subcarriers, 4 pilot subcarriers, and there are 30 available data subchannels; one uplink frame contains 35 subchannels, with each subchannel containing 24 subcarriers; and the remaining subcarriers in the uplink and downlink are all protect subcarriers.

Since a TDD system is used, the same frequency point is used in the uplink and downlink of the same channel and a time division multiplexing method is used. The symbol bandwidths of the uplink and downlink are different according to different symbol ratios. Considering various properties, such as system and terminal docking requirement, the operation mode switching requirement of a transceiver and wireless propagation, RTG and TTG are required to be reserved in advance when the base stations transmit and receive signals such that the system can switch jobs normally. In the 802.16e RCT (Radio Conformance Test Specification), the RTG is set to be 60 µs and the TTG is set to be 105.7142857 µs for the 5/10 MHz system.

As shown in FIG. 9, in a downlink frame, the first symbol is a preamble area which is system fixed overhead for terminal synchronization. In the downlink frame, except the first preamble area, other areas form a slot based on 2 symbols*1 subchannel in the PUSC (partially used subchannel) replacement mode. The slot is a basic unit of multiuser scheduling performed by the downlink system. According to the size and QoS requirement of different PDUs (protocol data units) to be transmitted, the system assignments are grouped into different downlink bursts to satisfy system performance requirements. An uplink frame uses the similar method, except that it consists into a Slot according to 3 symbols*1 subchannel in the PUSC replacement mode.

In the scenario of power line based transmission, a optimized adaptive uplink scheduling algorithm, a flow control mechanism based on the base stations and BMU, and an end-to-end QoS mechanism between the base stations and the BMU are used. However, when the signal quality deteriorates, the last N symbols may be labeled as an unavailable state to avoid assigning uplink burst signals transmitted by the terminal in the last N symbol slots interval. In this way, the maximal system transmitting and receiving protection interval is Min (TTG, RTG+N*$T_{symbol}$), thus the requirement for system timing accuracy is reduced, thereby decreasing the probability of occurrence of interference between the terminals and between the terminal and the base station, guaranteeing the reliability of the timing information, and greatly improving the system robustness.

For a 5 MHz/10 MHz 802.16e system, $T_{symbol}$ is 102.8571 μs in the case where 1/8CP (cyclic prefix) and 5 ms frame are used. If the symbol ratio of downlink to uplink is 31:16, then N=1, that is, the protection interval is Min (TTG, RTG+1*$T_{symbol}$)=TTG=105.7142857 μs. After one idle uplink symbol which is not scheduled is removed, there may remain 31 downlink symbols and 15 uplink symbols to be scheduled to meet the PUSC replacement mode, meanwhile, there is no big change in uplink spectrum efficiency essentially. For other symbol ratios, N may be a larger number, although it means little since the TTG has already limited further expansion of the protection interval. After the adaptive scheduling algorithm is used, the maximum timing accuracy which the base station system can tolerate is 50 μs, greatly improving system anti-interference capability.

Figure 10:
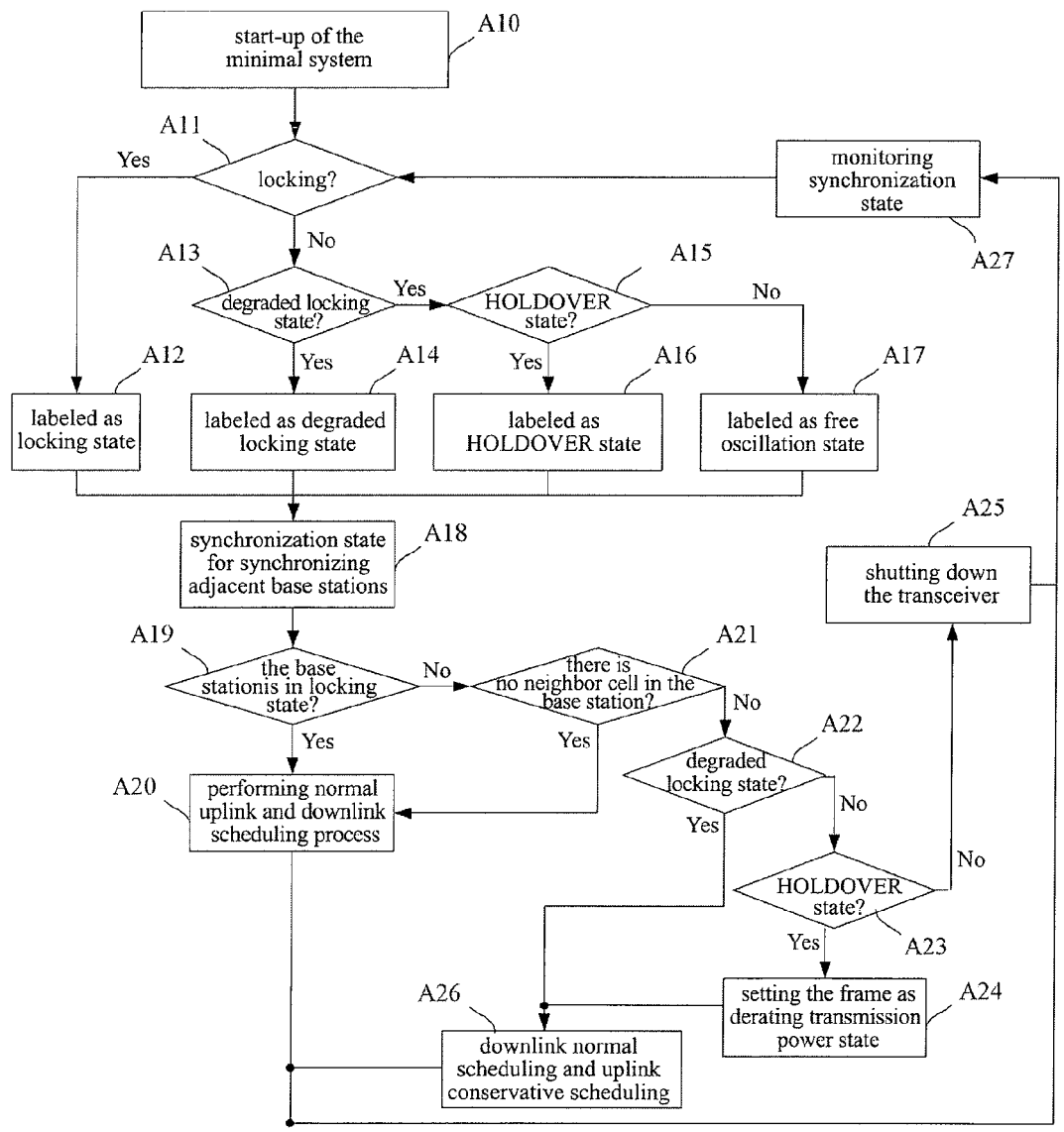
FIG. 10 is a flow chart of a scheduling method of a power line transmission based synchronization state.

FIG. 10 is an example of a scheduling method of power line based clock recovery performance. Firstly, various synchronization states and their corresponding scheduling methods are required to be configured in the base station, and a decision condition of each synchronization state related the timing accuracy is required to be configured. In this example, there are a variety of synchronization states of a clock recovery circuit of a timing client in the base station (is also referred to as synchronization states of the base station), and the each state and its decision method is as follows.

If the system timing algorithm converges completely, the timing accuracy (which can be calculated according to the convergence situation of the timing algorithm) is higher than $t_1$ (which is 20 μs by default) and a locking state is determined, in other words, the base station is synchronous with the BMU at this point; if other state is determined, then it is believed that the base station is not synchronous with the BMU.

If the system timing algorithm does not converges completely, the timing accuracy is lower than $t_1$, but higher than $t_2$ ($t_2 > t_1$, and $t_2$ is 50 μs by default), then a degraded locking state is determined;

After the degraded locking state maintains for a period of $T_1$, it is determined that a HOLDOVER state is entered.

After the HOLDOVER state maintains for another period of $T_2$, it is determined that a free oscillation state is entered.

If the timing accuracy is lower than $T_2$, it is determined directly that a free oscillation state is entered.

As shown in FIG. 10, the scheduling method of the power line based clock recovery performance comprises the following steps:

Step A10, when the base station starts up, a power-up and normal start-up process of the minimal system is firstly performed, where this step comprises transmitting and recovering timing information between the BMU and the base station using a ToP method.

The minimal system does not include a transmitter of the base station to mainly avoid the interference caused by unreasonable frequency points to other base stations during powering up.

Step A11, after the minimal system operates normally, the base station checks the synchronization state of the ToP client, if the synchronization state is the locking state, this step proceeds to step A12; otherwise, this step proceeds to step A13.

Step A12, the synchronization state is labeled as the locking state, and then step A18 is performed;

Step A13, the base station further determines whether the synchronization state of the ToP client is the degraded locking state, and this step proceeds to step A14 if yes and proceeds to step A15 if not;

Step A14, the synchronization state is labeled as the degraded locking state, the scheduling mechanism is set to be a conservative scheduling, an uplink conservative scheduling process is performed, and then step A18 is performed;

Step A15, it is further determined whether the synchronization state of the ToP client is the HOLDOVER state, and this step proceeds to step A16 if yes and proceeds to step A17 if not;

Step A16, the synchronization state is labeled as the HOLDOVER state, the scheduling mechanism is set to be the conservative scheduling, the uplink conservative scheduling process is performed, and then step A18 is performed;

Step A17, the synchronization state is labeled as the free oscillation state, a base station transmission link is shut down by default, a R6 interface network link communication is maintained normal, alarm information is reported timely such that the network management staff can perform failure location and system maintenance, and step A18 is performed;

Step A18, the base station reports the state information to the master BMU which notifies neighbor cell information of the base station to its linked base stations, the neighbor cell information may also contain neighbor cell synchronization state information for synchronizing the adjacent base stations, in addition to information whether there are neighbor cells or not.

After the base station receives the neighbor cell information, it performs the following steps.

Step A19, determining whether the base station is in the locking state or not, and proceeding to step A20 if yes and proceeding to step A21 if not.

Step A20, performing the normal uplink and downlink scheduling process, wherein all uplink symbols are in an available state and the transmitting and receiving links operate normally, and then proceeding to step A27.

Step A21, further determining whether there are neighbor cells in the base station or not, and proceeding to step A20 if not and proceeding to step A22 if yes.

Step A22, further determining whether the base station is in the degraded locking state or not, and proceeding to step A26 if yes and proceeding to step A23 if not;

Step A23, further determining whether the base station is in the HOLDOVER state or not, and proceeding to step A24 if yes and proceeding to step A25 if not.

Step A24, setting the maximum transmission power as a derating state, for example, decreasing by 6 dB (decibel), with the specific strategy being configurable in the back stage, and then proceeding to step A26.

Step A25, if the system does not operate in an isolated island state, and the synchronization state is the free oscillation state, then shutting down the transceiver while maintaining normal operation of the R6 interface link, and returning to step A11 to wait for the system to return to the normal state.

Step A26, when the base station downlink scheduling process is normal, labeling the last N uplink symbols as unavailable, entering into the uplink conservative scheduling process, and then proceeding to step A27; and Step A27, continuing monitoring the system clock state and returning to step A11.

After the base station's synchronization state is determined in above steps A19, A22, A23 and A25, the synchronization state should be updated if it is different from the base station's previous synchronization state.

The state determination described above is performed periodically, and the scheduling processing strategy is updated and performed by taking the frame as the minimal performing period.

In order to implement the above scheduling, the TOP client in the access point is required to comprise:

a configuration information storage unit configured to store a plurality of configured synchronization states and their corresponding scheduling methods, as well as a decision condition of each synchronization state related to the timing accuracy;

a timing signal recovery unit configured to recover a timing signal based on the received timing packet, output the timing signal to a baseband and RF model, and at the same time output convergence situation of the timing algorithm to a synchronization state determining unit;

the synchronization state determining unit configured to determine the current timing accuracy according to the convergence situation of the timing algorithm, determine and output the current synchronization state to a scheduling control unit in combination with the preset synchronization state determination condition; and the scheduling control unit configured to determine and perform the corresponding scheduling method according to the current synchronization state.

It can be seen from the above example of the scheduling method that in the case where the power line transmission quality remains abnormal, the timing accuracy of the base station may be decreased. In this case, the BMU side unifies the scheduling strategy, coordinates the scheduling mechanism of its managed linked WiMAX base stations, ensures that the interference between the base stations is minimized and guarantees the transmission reliability. The service performance between the linked base stations of the BMU is improved, thereby significantly increasing the KPI (Key Performance Indication) of the indoor coverage network, including reduced delay and decreased jitter, and reduced switch interruption and completion time, and improving the user satisfaction. In the case where the local timing accuracy is extremely deteriorated or unavailable, the method of reducing the transmission power or even shutting down the base stations is used to avoid the degradation of the overall network quality.

It should be noted that the state configuration and the corresponding scheduling method described above are only examples, in other embodiments, the degrading locking and HOLDOVER states can be combined as a single state in which the last uplink N symbols are labeled as unavailable.

Moreover, the names of the above states are not limited to those used in the above embodiment, because the names are only used to distinguish the different states with different timing accuracies.

Flow Control

In the scenario of power line based transmission, considering that the slave BMU's linked Pico BSs actually use a mechanism in which the power line bandwidth is shared (e.g., TDMA or CSMA technology), and there is possibility of burst interference. Since a robust transmission network with broad bandwidth and high reliability is connected between the BMU and the network sides, there is potential asymmetry between R3/R4 and R6 interfaces. In the case where burst flow is relatively large in a Pico BS, the flow from other linked base stations of the BMU may be obstructed, resulting in network collapse.

In order to better guarantee the performance of the timing information, control interface information and user plane information transmitted in the Ethernet and the power line, the master BMU and the Pico BSs are required to support the flow control function and the matching of a strategy definition of synchronizing the Ethernet QoS and power line QoS, thus ensuring that the processing mechanism of the Ethernet and power line networks can effectively guarantee reliable and preferential transmission of ToP information packets. According to system index and performance requirements, flow control parameters, timing, control plane, QoS information corresponding to user plane data are configured at the BMU side and the Pico BS side. The end-to-end flow control can be implemented at the Pico BS side and the BMU side. Experiments show that after the flow control mechanism is implemented, the transmission performance of the R6 interface can be well ensured; meanwhile, the transmission performance of the timing information can be well ensured.

Figure 11:
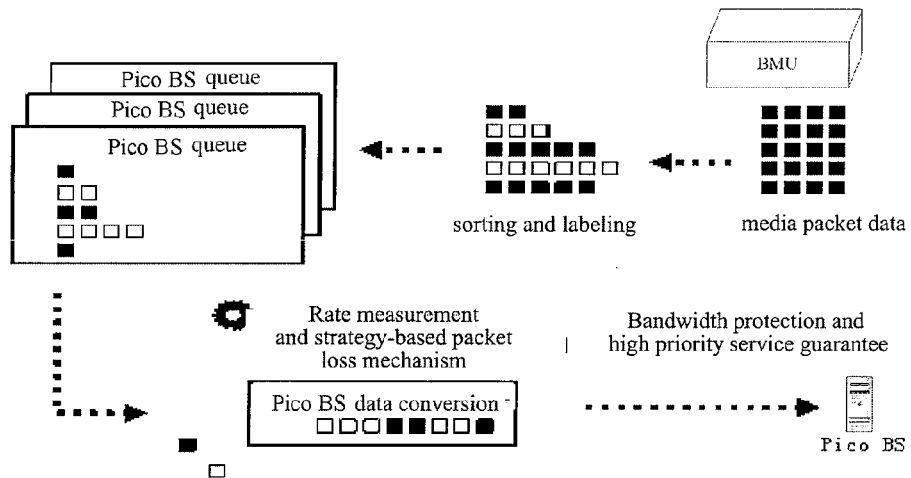
FIG. 11 is a schematic diagram of flow control between the BMU and the Pico BSs.

The method of controlling the flow between the BMU and the Pico BSs will be described below through an example. FIG. 11 is a schematic diagram of the flow control between the BMU and the Pico BSs. The BMU uses a fair principle to ensure that its linked Pico BSs have equal opportunity for sharing the network bandwidth, and guarantees the performance of services with high priority in the case of network congestion. When media packet data arrives at the BMU, the data packets are sorted and labeled to enter a queue of each Pico according to a target address. Continuous rate measurements are achieved in a distribution module of the BMU. In the case of no congestion, the data packets are routed normally to each Pico BS. Once congestion occurs, a strategy based packet loss mechanism is carried out and is described in detail below.

The respective guaranteed bandwidth and maximum available bandwidth of the uplink and downlink of each Pico BS is set at an EMS side.

The downlink flow control for the downlink is performed at the BMU side, and the BMU identifies and records the flow based on each Pico BS. If the statistic flow of the Pico BS is within a preset range of the guaranteed bandwidth, the Pico BS' data is stored and forwarded normally; if the statistic flow of the Pico BS is beyond the range of the guaranteed bandwidth but smaller than the maximal available bandwidth, then it is assigned to the overloaded Pico BS queue by using the weighted fair algorithm based on the maximum remaining bandwidth calculated by the BMU (which is equal to the downlink maximum operation bandwidth of the BMU minus the downlink bandwidth used by the BMU, or equal to the downlink maximum operation bandwidth multiplied by a load threshold in percent minus the used downlink bandwidth); if the Pico BS' flow is still overloaded, a data message of a BE (Best Effort) service list of the base station is discarded first.

The uplink bandwidth control for the uplink is performed in the Pico BS, its basic principle is the same as that of the downlink bandwidth control, and the difference is that when the Pico BS assigns the bandwidth to each terminal user according to the uplink bandwidth, it strictly guarantees that the assigned uplink flow does not exceed the maximum available bandwidth. If it is found at the BMU side that the overall uplink bandwidth exceeds the load threshold of its processing capability (which may be configured by the EMS, and generally is set reasonably in the range of 70%~75% based on algorithm simulation and a practical test experimental value), a list of candidate Pico BSs with the bandwidth exceeding the uplink guaranteed bandwidth is identified, a flow control message is sent to the Pico BSs in the list, and the bandwidth is decreased to the range of the guaranteed bandwidth at the Pico BS side.

Through the practical test and check, the congestion in the whole network can be avoided effectively based on the flow control strategy of the BMU and the Pico BSs, thereby improving the system robustness greatly.

Network Management

Figure 12:
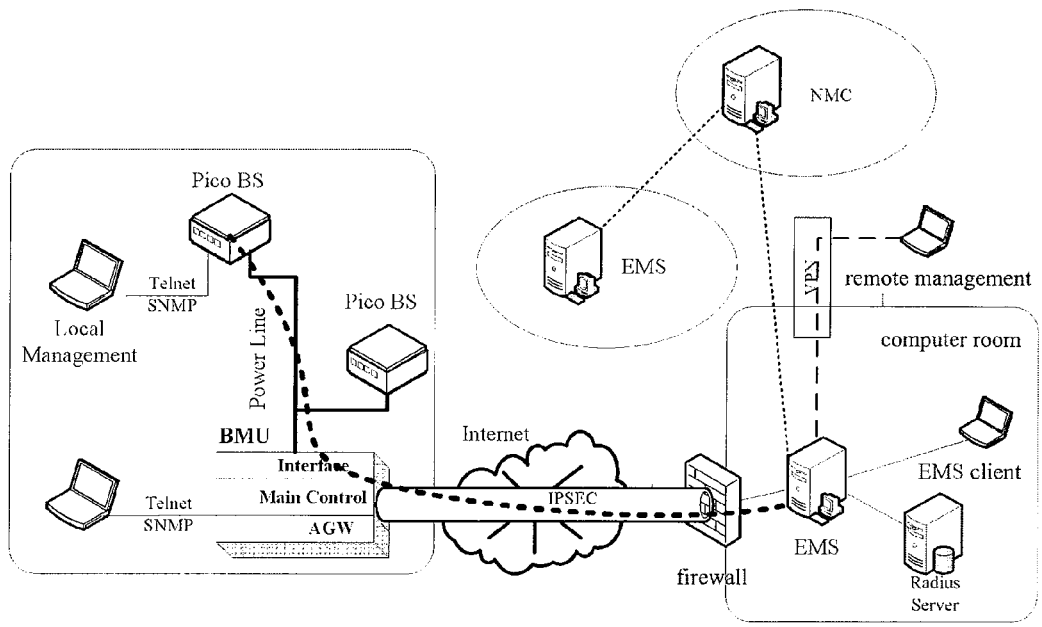
FIG. 12 is a schematic diagram of a network management system based on a layered WiMAX access point.

FIG. 12 is a layered WiMAX access point network management system. Since for an indoor coverage system, generally more than ten or even tens of Pico BSs 801 are required to be deployed in one station (e.g., a skyscraper, CBD business building); and tens of thousands Pico BSs are typically required to be deployed in one city. The conventional network management architecture uses the centralized architecture. An EMS (Element Management System) server is located in a central computer room, and a backup configuration method of distributed disaster tolerant is used in view of the reliability. Considering performance expansion, a number of high-performance EMS servers are used to implement cascade and expansion using a load sharing method. According to the conventional network management scheme, requirement for the performance of the centralized network management is extremely high, including real-time processing capability, network storm suppression capability as well as storage capability.

The present invention provides a distributed network management system based on the layered BMU architecture to implement partial network management function at the BMU and the Pico BS sides.

The network management in the present invention is divided into four portions, local network management function (implemented by a network management agent module in the Pico BS) of the Pico BS, a local centralized network management agent function module (implemented by a network management agent module in the BMU) of the BMU, network management function at the EMS server side, and network management function of the NMC (Network Management Center).

In order to decrease the Pico BS operation maintenance's requirement for the EMS server, the network management agent function is implemented in the network management agent modules residing in the BMU and Pico BS front desks, and the network management agent module in the BMU is used to interact with the EMS and the network management agent module of its linked access points, to implement the network management function of the master access point management unit and its linked access points. The network management agent module in the Pico BS is used to interact with the BMU to implement the network management function of the Pico BS. The network management function comprises one or more of performance statistics, software version management and maintenance, alarm information processing, configuration management, failure diagnosis.

The version management and maintenance mainly comprises the following aspects:

1) The BMU and each Pico BS stores their system configuration data in the form of file, and this file may be imported and exported. The remote operating and maintenance system, i.e., the EMS and NMC, stores a copy of the file, and the operation and maintenance staff may configure the BMU and the Pico BSs on site to form a new configuration file which will be uploaded to the EMS. Moreover, the operation and maintenance staff may also remotely use a VPN method to connect the local network manager in the central computer room, that is, the EMS client in the figure, or check system configuration of the BMU at the EMS client. If there is a problem in the system configuration of the BMU, the system configuration may be updated remotely.

2) The BMU operating and maintenance system provides local and remote version update function. The operation and maintenance staff may upgrade the system version on site, or update the system version of the BMU remotely. Two system versions may be stored in the BMU, which, will automatically return to the previous available version when the remote update fails, thereby increasing the system availability greatly 3) When the version is updated remotely, the EMS uniformly distributes the content of the new version to the target BMU and controls the version distribution and activation process.

Compared with the conventional centralized network management architecture, the layered network management structure improves upgrade efficiency, for example, if the EMS links with 10000 Pico BSs and there are 500 BMUs, each BMU links with 20 Pico BSs according to the layered access point architecture; if the EMS directly supports version upgrading for 10000 base stations, 10000 pieces of version data are required to be distributed; for the layered network architecture, however, only 500 pieces of version data are required to be distributed. After distributed to the BMU, the content of the new version related to the Pico BSs is further distributed to its linked Pico BSs by the BMU. The load of the backbone transmission network is decreased by 95%, while most of the load is controlled within the local area network composed of the BMU and the Pico BSs, and the bandwidth is always abundant and the QoS can be guaranteed inside the local area network, thus improving the performance and the reliability from a standpoint of version management.

The performance statistics mainly comprises:

1) The BMU may collect operation situation of service wireless resources of its linked base station systems in real time, dynamically observe and track system resources and the users' service using condition to facilitate control and management for the system resources.

2) The BMU may check application condition of RF resources of a Pico BS, check and update the RF transmission power so as to appropriately adjust the coverage range according to the networking requirement.

3) The BMU automatically analyzes data based on the operation situation of the wireless resources in the above performance statistic data: if the wireless resource utilization rate is overloaded and congested in a continuous period (which can be configured by the EMS and is 7~15 days by default) in a base station, a system capacity alarm notification is sent and used by a network manager as a decision basis for determining whether to optimize the wireless resource configuration or not.

The alarm information processing comprises:

1) The BMU collects system operation status information of its linked base stations in real time, and, and records abnormal information and uploads abnormal data to the EMS once abnormity is detected; the operation and maintenance staff may detect and diagnose the abnormal information on site or remotely. The EMS diagnoses system errors according to the related alarm and abnormal reporting information.

2) In order to suppress network alarm storm, an alarm shielding option may be set through the EMS filter (configured between the EMS and the BMU), non-urgent alarm information is shielded and stored at the BMU side, and only an important alarm option is sent to the EMS. According to failure location requirements, the BMU in the designated area is polled at the EMS side to report failure information at the specified time, thereby decreasing load and processing capability requirements for the EMS server by the greatest extent.

A Radius server is configured to implement location management function for the Pico BS to ensure a legal Pico BS to be connected to the network.

Considering the security, IPSEC (Internet Protocol Security) is used between a network management center (EMS and NMC) and the BMU to bear network management information, and a firewall is configured in the direction from the network management center to a public network.

The network method in accordance with the present invention may well implement layered management function, suppress the network storm and implement the distributed network management capacity expansion scheme.

Figure 13:
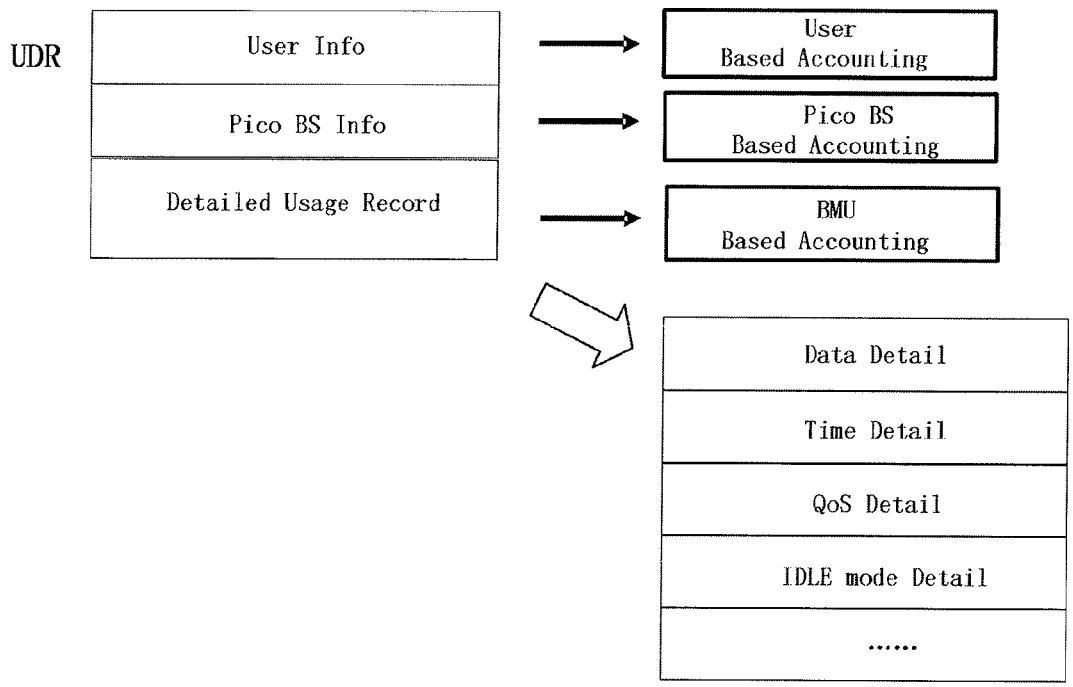
FIG. 13 is a schematic diagram of a charging strategy of a wireless access system in accordance with the present invention.

FIG. 13 is a schematic diagram of a charging strategy of a wireless access system in accordance with the present invention. Based on the layered access point management network architecture, a flexible charging strategy may be defined at the CSN side, where the charging strategy may comprise a user based charging strategy, base station based charging strategy, and BMU based charging strategy. The base station based charging strategy and BMU based charging strategy are applicable to the intranet application scenario. According to the operation scenario and running strategy of the operators, different charging measures are defined in the BMU and AAA (Authentication, Authorization and Accounting server), charging information, including user information, the base station in which the users is located and the detailed phone bill record, is generated in an AGW-Lite module inside the BMU. The phone bill record may contain data information, time information, QoS information, and idle mode information.

Figure 14:
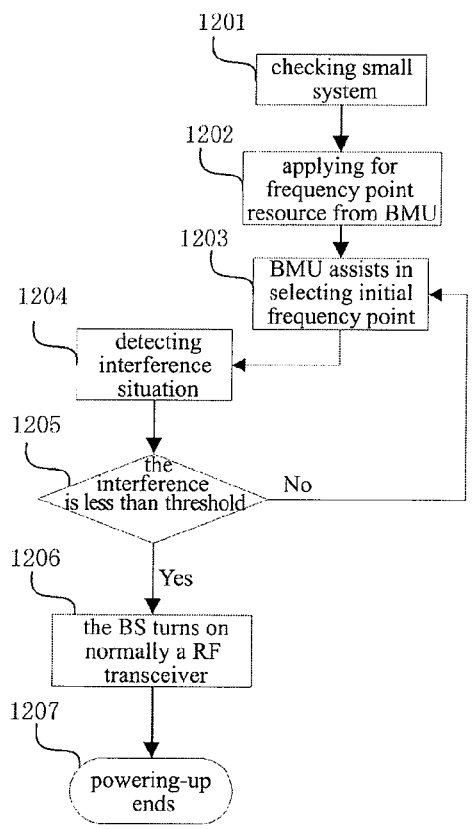
FIG. 14 is a flow chart of automatic frequency assignment of the Pico BSs in accordance with an embodiment of the present invention.

FIG. 14 is a flow chart of automatic frequency assignment of the Pico BS in accordance with an embodiment of the present invention. Compared with the traditional Wifi automatic frequency assignment, the main difference is that the automatic configuration and management may be implemented easily with the assistance of the master BMU.

At the base station side, a list of legal frequency resources, which is forwarded by the back end EMS server via the BMU, is required to be acquired so as to perform proper frequency assignment operation. The specific steps will be described bellow.

Step 1201, when the Pico BS system starts up, a power-up self check and normal start-up process of the minimal system is firstly performed, where the minimal system does not include a transmitter of the base station to mainly avoid the interference caused by unreasonable frequency points to other base stations during powering up.

Step 1202, after the minimal system operates normally, the base station system initiates a handshake authentication process to the BMU to apply for legal frequency point resources.

Step 1203, the selection of the frequency point resources for each linked node of the BMU is implemented at the BMU side based on neighbor relationship between the base stations, and the recommended candidate frequency is given to the base station for reference.

When the frequency assignment for the base stations is implemented at the BMU side, the following centralized application scenarios may be considered: (1) the initial network construction using the PUSC Segment method; (2) network capacity expansion where the amount of base stations is increased and the frequency resources are reassigned among the newly added base stations and the existing base stations; (3) base station capacity expansion which is a upgrade from the PUSC Segment to the PUSC All subchannel method; (4) an abnormal re-start up procedure of the base stations.

The first three scenarios are required to cooperate with the EMS to complete the frequency configuration and are synchronized to the BMU so as to select the corresponding automatic processing strategy at the BMU side. In the fourth scenario, the processing strategy used by the BMU is that the historical frequency point information of this base station is stored and fed back to the base station.

In the following, Neighborlist ($BS_i$) is defined as a neighbor list of base station i; Freq ($BS_i$) is Freq/Seg (frequency point and segment) configuration information of the $BS_i$; and Freq (BMU) is all Freq/Seg resources for the BMU to choose.

The processing strategy of the first scenario is that: during the initial network construction, the $BS_n$ and BMU first acquire the neighbor list of each base station $BS_n$ and select the $BS_i$ with the simplest neighbor relationship, which is usually a base station with the physical position being opposite the edge, and a program randomly selects the Freq/Seg ($BS_i$); a frequency assignment program is automatically performed to determine the Freq/Seg of the base station in the neighbor list of this base station (BS∈Neighborlist ($BS_i$)) based on a principle that the neighbor base stations use different Freq/Seg; a iterative program is performed until the frequency and segment information assignment for all the base stations is completed.

The processing strategy of the second scenario is that: for the newly added base station $BS_n$, the BMU acquires neighbor cell frequency point information Freq (Neighborlist (BSn)) of the $BS_n$ based on the Neighborlist ($BS_n$) of the newly added base station $BS_n$; selects randomly a frequency point from a complementary set of Freq (BMU) ∩ Freq (Neighborlist ($BS_n$)) and sends it to the $BS_n$. That is, one frequency point different from the frequency point of the neighbor cell of the base station is selected from all the Freq/Seg for the BMU to choose and assigned to the base station.

The processing strategy of the third scenario is basically the same as that of the first scenario, and the only difference is that the assigned frequency information is required to be changed from the frequency point and segment in the first scenario into the frequent: during the initial network construction, the $BS_n$ and BMU first acquire the neighbor list of each base station $BS_n$ and select the $BS_i$ with the simplest neighbor relationship, which is usually a base station with the physical position being opposite the edge, and a program randomly selects the Freq ($BS_i$); a frequency assignment program is automatically performed to determine the Freq of the base station in the neighbor list of this base station (BS∈Neighborlist ($BS_i$)) based on a principle that the neighbor base stations use different Freq; a iterative program is performed until the frequency information assignment for all the base stations is completed.

Consider that some operators may not have many frequency point resources, in the present invention, considering that although the base stations are adjacent physically during the planning, due to excellent isolation between the adjacent areas, they are not considered to be adjacent logically in configuration.

Step 1204, the receiver is enabled to detect the RSSI (Received Signal Strength Indication) of a signal at the frequency point, and step 1205 is performed.

Step 1205, if an interference signal at this frequency point is lower than a preset threshold, it is indicated that this frequency point is available, step 1206 is performed; if the interference is found to be severe during the interference signal detection process, that is, the interference signal at this frequency point is greater than or greater than or equal to the preset threshold, then this step proceeds to re-selecting frequency step 1203.

Step 1206, the system performs the normal operation process and turns on a transceiver circuit of the base station.

Step 1207, the uplink and downlink processing begins according to the wireless parameter configuration of the network management, and the process ends.

The frequency automatic assignment process described above can be enabled or disabled through a network management interface in order to accommodate network environments with different complicacies.

To sum up, the present invention provides a layered architecture and a specific solution in a wireless access system mainly based on indoor coverage, and the following technical effects are achieved.

1) A flexible interface and media form between the Pico BSs and the BMU facilitates project deployment and fast network construction;

2) The layered network management architecture is supported, the system expandability and network performance are improved greatly, facilitating large capacity network construction, the layered transmission of network management information and local routing of the BMU and base station internal information. Most of flow is controlled within the local network to save the network management and transmission bandwidth.

3) The BMU is installed near the Pico BSs, and the signaling interaction is completed in the local area network, thereby improving greatly media interface interaction performance between the linked base stations of the BMU, including the reduced access time, reduced delay and jitter, as well as the decreased switching interruption and complement time, augmenting user satisfaction.

4) The base stations share a GPS clock configured by the BMU to support the timing information transmitted through the twisted wire, cable, optical fiber or power line. The recovery of the timing information is completed in the base stations without configuring a GPS module and installing antenna in each base station, decreasing the project difficulty and cost for deploying indoor cable resources and installing the antenna, and reducing the operators' CAPEX (capital expenditures) and OPEX (revenue expenditures).

5) Due to the uncertainty caused by the interference signal of the power line system, accordance to the present invention, a system adaptive intelligent scheduling mechanism is implemented based on link state and timing signal recovery quality to guarantee the system robustness, improving greatly environmental adaptability of the system and augmenting the system availability.

6) The upgrade from the PUSC Segment to the PUSC all subchannels networking method is supported.

7) In combination with the DAS (distributed antenna system) in a local area, the Pico BS may improve the system coverage performance perfectly by causing the antenna to approach a user unit, meanwhile, the proportion of high order modulation is increased, thereby increasing system average throughput.

INDUSTRIAL APPLICABILITY

The present invention may be applied to wireless access systems to well solve the conflict among the indoor deployment difficulty, project quantity and maintenance management, and distribute GPS clock information packets to the base stations at the centralized point to achieve indirect synchronization between the base stations. It provides a timing quality recovery based dynamic scheduling mechanism for the network quality of the power line transmission, and provides a relatively large air interface capacity in the case of higher timing accuracy, and guarantees reliable operation of the system by decreasing system capacity in the case of decreased timing accuracy.

I claim:

1. A synchronization method of a layered wireless access system, which is applied to the layered wireless access system including an access point management unit located in an access layer and its linked access points, the access point management unit having a timing server, each access point having a timing client, the method comprising the steps of:

the timing server generating timing information and distributing it to the timing client of each linked access point, and the timing client recovering the timing information as a local timing reference signal;

wherein the access point management unit comprises a master access point management unit having an access gateway function and one or more slave access point management units connected to the master access point management unit, the master access point management unit and slave access point management unit which are connected directly to the linked access points have power line modulation and demodulation functions, and power lines are used as transmission media for the linked access points which are directly connected;

the timing server is a ToP server; and the timing client is a ToP client;

the access point management unit also includes a master control switching module, an access gateway function module and a centralized network management function module connected to the master control switching module;

wherein the master control switching module processes and forwards data and signaling interaction of the linked access points of the access point management unit;

the access gateway function module completes an aggregation of access information of access points and the processing of tunnel protocols, while providing route switching related information to a corresponding centralized access gateway; and processes a function of local wireless resource and self-routing function of local flow; and completes termination processing for its linked access points tunnel, flow shaping and flow control for a plurality of linked access points, as well as data flow scheduling processing based on access points; and the centralized network management function module performs operation maintenance and information processing of the access point management unit.

2. The synchronization method according to claim 1, wherein:

in the timing server and timing client, the type of Quality of Service (QoS) of the timing information is configured to have the same priority as or higher priority than real-time services, a scheduling strategy corresponding to this type of QoS is performed at the sides of the access point management unit and the linked access points, respectively, and the timing information is distributed and routed according to requirements which are the same as or better than those of the real-time services, an end-to-end flow control mechanism is achieved between the access point management unit and the access points, and when the access points are not synchronous with the access point management unit, the flow control mechanism is enabled and data is sent according to a normal process after the synchronization.

3. The synchronization method according to claim 1, wherein the layered wireless access system also uses one or more of the following methods to improve synchronization performance:

upon power-up initializing, the timing server in the access point management unit sends timing information data to the linked access points by broadcasting the shortest packet in a subnet;

in an initial access state, the access points which are newly added into the network only transmit basic timing packets and state configuration information to the access point management unit; the access point management unit controls whether the access points can be powered up and started up normally according to feedback situation of access point synchronization state information;

loosely coupled phase-locked loop, narrowband loop and adaptive filter algorithms are used to filter out jitter and drifting in the Ethernet; an adaptive maintaining HOLDOVER algorithm is used to automatically check network synchronization quality, and automatically memorize control parameters in the case of optimal synchronization performance; when the network quality deteriorates, a HOLDOVER state is automatically entered, and current control parameters are refreshed using the memorized control parameters;

the access point management unit adjusts sending frequency of ToP messages and optimizes synchronization performance when bandwidth occupancy rate of transmission data of all nodes is lower than a preset threshold; and the access point management unit continuously measures speed, and data packets are normally routed to each access point in the case of no congestion; once the congestion occurs, a strategy based packet loss mechanism is implemented and performance of services with high priority is guaranteed.

4. A flow control method of a layered wireless access system which comprises an access point management unit located in an access layer and its linked access points, wherein the access point management unit is connected directly to its linked access points and has power line modulation and demodulation function, and power lines are used as transmission media between the access point management unit and its linked access points, the flow control method comprises:

when media packets arrive at the access point management unit, after being sorted and labeled, the packets entering into a queue of each access point according to a destination address and being sent to corresponding access points, and end-to-end flow control being established between the access point management unit and each access point;

the access point management unit also includes a master control switching module, an access gateway function module and a centralized network management function module connected to the master control switching module;

wherein the master control switching module is configured to process and forward data and signaling interaction of the linked access points of the access point management unit;

the access gateway function module is configured to complete the aggregation of access information of access points and the processing of tunnel protocols, while providing route switching related information to a corresponding centralized access gateway; to process function of local wireless resource and self-routing function of local flow; and to complete termination processing for its linked access points tunnel, flow shaping and flow control for a plurality of linked access points, as well as data flow scheduling processing based on access points;

the centralized network management function module is configured to perform operation maintenance and information processing of the access point management unit.

5. The flow control method according to claim 4, wherein:

the access point management unit configures a guaranteed bandwidth and maximum available bandwidth of a downlink of each linked access point; and when controlling flow of the downlink, the access point management unit identifies and records flow of each linked access point, and normally stores and forwards data of the linked access point if the recorded flow of the linked access point is within a range of the preset guaranteed bandwidth, uses a weighted fair algorithm to assign the remaining bandwidth to an overloaded linked access point queue if the recorded flow of the linked access point is beyond the range of the guaranteed bandwidth but smaller than the maximum available bandwidth, and then discards packets in a best-effort BE service queue of the linked access point first if the recorded flow of the linked access point is still overloaded.

6. The flow control method according to claim 4, wherein:

the access point management unit configures a guaranteed bandwidth and maximum available bandwidth of each linked access point;

the access point controls each flow, and when assigning bandwidth to each terminal user according to requirements, guarantees that the assigned flow does not exceed the maximum available bandwidth; and when the access point management unit detects that overall bandwidth exceeds load threshold of its processing ability, it sends a flow control message to the access points in which the flow exceeds the guaranteed bandwidth, and after the access points receive the flow control message, the bandwidth is decreased to a range of the guaranteed bandwidth.

7. A scheduling method based on a synchronization state in a layered wireless access system which comprises an access point management unit located in an access layer and its linked access points, wherein the access point management unit is connected directly to its linked access points and has power line modulation and demodulation function, and power lines are used as transmission media between the access point management unit and its linked access points, the scheduling method comprises:

configuring a plurality of synchronization states and their corresponding scheduling modes at the access points, and configuring a decision condition of each synchronization state related to timing accuracy; and after the access points receive data packets of timing information distributed by the access point management unit, recovering the timing information and checking current timing accuracy, determining a current synchronization state in combination with the decision condition, and then performing uplink and downlink scheduling according to a scheduling mode corresponding to the current synchronization state;

the access point management unit also includes a master control switching module, an access gateway function module and a centralized network management function module connected to the master control switching module;

wherein the master control switching module is configured to process and forward data and signaling interaction of the linked access points of the access point management unit;

the access gateway function module is configured to complete the aggregation of access information of access points and the processing of tunnel protocols, while providing route switching related information to a corresponding centralized access gateway; to process function of local wireless resource and self-routing function of local flow; and to complete termination processing for its linked access points tunnel, flow shaping and flow control for a plurality of linked access points, as well as data flow scheduling processing based on access points;

the centralized network management function module is configured to perform operation maintenance and information processing of the access point management unit.

8. The scheduling method according to claim 7, wherein:
the synchronization states comprise a locking state, a free oscillation state and at least one intermediate state, and timing accuracy corresponding to the intermediate state is between the locking state's and the free oscillation state's;

when the access point determines that the current synchronization state is the locking state in which the timing accuracy meets requirement, it performs the normal uplink and downlink scheduling;

when the access point determines that the current synchronization state is the free oscillation state in which the access points cannot operate normally and there are neighbor cells, it shuts down a transceiver, while maintaining normal operation of a link between the access point and its access point management unit; and when the access point determines that the current synchronization state is the intermediate state and there are neighbor cells, it labels the last n symbols as unavailable in the uplink, where n=1, 2, 3 . . . .

9. The scheduling method according to claim 8, wherein:
the intermediate state is divided into at least a first state and a second state, and the second state is a state after the first state is maintained for a preset period;

when the access point determines that the current synchronization state is the first state and there are the neighbor cells, it labels the last one or more symbols as unavailable in the uplink and performs normal scheduling in the downlink; and when the access point determines that the current synchronization state is the second state and there are the neighbor cells, it labels the last N symbols as unavailable in the uplink and sets the maximum transmission power as a derating state in the downlink.

10. The scheduling method according to claim 7, wherein:
when the access point is started up, power-up self-checking and normal starting-up process of a minimal system without a transmitter is performed, and then the current synchronization state is checked and labeled according to convergence situation of a timing algorithm at a timing client; and afterwards, the access point periodically checks and updates the synchronization state, and updates and performs a scheduling strategy according to the checked current synchronization state.

11. The scheduling method according to claim 7, wherein:
the access point management unit is a master access point management unit having access gateway function, and communication cables or power lines are used as transmission media between the master access point management unit and its linked access points; or the access point management unit comprises a master access point management unit having access gateway function and one or more slave access point management units connected to the master access point management unit, the master access point management unit and slave access point management units which are connected directly to the linked access points have power line modulation and demodulation function, and power lines are used as transmission media for the linked access points which are directly connected.

12. The scheduling method according to claim 7, wherein:
the access point reports the synchronization state to its master access point management unit, and the master access point management unit notifies its linked access points of neighbor cell information of each access point, the neighbor cell information comprises whether there are neighbor cells and synchronization states of the neighbor cells.

13. A distributed network management system in a layered wireless access system, wherein the distributed network management system comprises a network element management system and a network management center, and wherein:

an access layer network element managed by the network management system is based on a layered structure and comprises a master access point management unit located in an access layer and its linked access points, wherein the master access point management unit is connected directly to its linked access points and has power line modulation and demodulation function, and power lines are used as transmission media between the master access point management unit and its linked access points, and the network management system comprises a first network management agent module resided in the master access point management unit and a second network management agent module resided in an access point, and wherein:

the first network management agent module is configured to interact with the network element management system and its linked access points to achieve network management function of the master access point management unit and its linked access points; and the second network management agent module is configured to interact with the access point management unit to achieve network management function of the access point;

the access point management unit also includes a master control switching module, an access gateway function module and a centralized network management function module connected to the master control switching module;

wherein the master control switching module is configured to process and forward data and signaling interaction of the linked access points of the access point management unit;

the access gateway function module is configured to complete the aggregation of access information of access points and the processing of tunnel protocols, while providing route switching related information to a corresponding centralized access gateway; to process function of local wireless resource and self-routing function of local flow; and to complete termination processing for its linked access points tunnel, flow shaping and flow control for a plurality of linked access points, as well as data flow scheduling processing based on access points;

the centralized network management function module is configured to perform operation maintenance and information processing of the access point management unit.

14. A network management method based on the network management system of claim 13, wherein:

partial network management function is achieved at sides of a master access point management unit and access points, and wherein the master access point management unit exchanges network management information with a network element management system to achieve network management function for the master access point management unit, meanwhile, the master access point management unit exchanges network management information with its linked access points to achieve network management function for its linked access points.

15. The network management method according to claim 14, wherein:

the network management comprises performance statistics which comprises one or more of the following processing operations:

the master access management unit collects operation condition of service wireless resource of its linked access points in real time, dynamically observes and tracks system resource and user service usage situation;

the master access management unit checks application situation of RF resource at a access point, and checks and updates RF transmission power; and the master access management unit automatically analyzes data according to the operation condition of the wireless resource in performance statistics data, and sends a system capacity alarm notification to the network element management system if overload and congestion of wireless resource utilization ratio occur in an access point in continuous periods.

16. A frequency assignment method in a layered wireless access system which comprises an access point management unit located in an access layer and its linked access points, wherein the access point management unit is connected directly to its linked access points and has power line modulation and demodulation function, and power lines are used as transmission media between the access point management unit and its linked access points, the frequency assignment method comprises:

after starting up and operating normally, the access points applying for frequency point resource from their access point management unit;

the access point management unit determining a candidate frequency point for each access point based on adjacent relationship between each access point and sending it to the corresponding access point; and the access point checking signal quality of its own candidate frequency point after receiving the candidate frequency point, notifying the access point management unit to reselect a frequency point if the checking is rejected and returning to the previous step, and entering a normal operation process if the checking is accepted;

the access point management unit also includes a master control switching module, an access gateway function module and a centralized network management function module connected to the master control switching module;

wherein the master control switching module is configured to process and forward data and signaling interaction of the linked access points of the access point management unit;

the access gateway function module is configured to complete the aggregation of access information of access points and the processing of tunnel protocols, while providing route switching related information to a corresponding centralized access gateway; to process function of local wireless resource and self-routing function of local flow; and to complete termination processing for its linked access points tunnel, flow shaping and flow control for a plurality of linked access points, as well as data flow scheduling processing based on access points;

the centralized network management function module is configured to perform operation maintenance and information processing of the access point management unit.

17. The frequency assignment method according to claim 16, wherein:

when the access point starts up, power-up self check and normal start-up of the minimal system are firstly performed, and then a handshake authentication process of the access point management unit is initiated to apply for legal frequency point resource; a receiver is turned on to perform received signal strength indication (RSSI) signal detection after the candidate frequency point sent by the access point management unit is received, and the checking is determined to be accepted if an interference signal at the candidate frequency point is smaller than or smaller than or equal to a preset threshold, otherwise, the checking is determined to be rejected.

18. The frequency assignment method according to claim 16, wherein:

when the access point management unit constructs a network using a partially used subchannel (PUSC) segment method, it selects the candidate frequency point and segment for the access points by: firstly obtaining a list of neighbor cells of each access point, selecting a access point with the simplest neighbor cell relationship, randomly selecting the frequency point and segment for the selected access point, then selecting a frequency point and segment for the access points in the list of the neighbor cells, and finally assigning different frequency points and segments for the adjacent access points, the candidate frequency point and segment being selected for each access point in turn in the same way.

19. The frequency assignment method according to claim 16, wherein:

when there is a new added access point, the access point management unit obtains information of a neighbor cell frequency point of the new added access point and selectable frequency point resource according to a neighbor cell relationship table of the new added access point, and selects a frequency point different from the neighbor cell frequency point of the new added access point.

20. The frequency assignment method according to claim 16, wherein:
when the access point management unit constructs a network using a partially used subchannel (PUSC) all subchannel method, it selects the candidate frequency point for the access points by: obtaining a list of neighbor cells of each access point, selecting a access point with the simplest neighbor cell relationship, randomly selecting a frequency point and segment for the selected access point, then selecting the frequency point and segment for the access points in the list of the neighbor cells, and finally assigning different frequency points and segments for the adjacent access points, the candidate frequency point and segment being selected for each access point in turn in the same way.

21. The frequency assignment method according to claim 16, wherein:
the access point management unit stores frequency point information of its linked access points, and after one of the linked access points becomes abnormal and restarts up, stores and feeds back its historical frequency point information to the access point.

22. The flow control method according to claim 5, wherein:
the access point management unit configures a guaranteed bandwidth and maximum available bandwidth of each linked access point;
the access point controls each flow, and when assigning bandwidth to each terminal user according to requirements, guarantees that the assigned flow does not exceed the maximum available bandwidth; and
when the access point management unit detects that overall bandwidth exceeds load threshold of its processing ability, it sends a flow control message to the access points in which the flow exceeds the guaranteed bandwidth, and after the access points receive the flow control message, the bandwidth is decreased to a range of the guaranteed bandwidth.

23. The frequency assignment method according to claim 17, wherein:
when the access point management unit constructs a network using a partially used subchannel (PUSC) segment method, it selects the candidate frequency point and segment for the access points by: firstly obtaining a list of neighbor cells of each access point, selecting a access point with the simplest neighbor cell relationship, randomly selecting the frequency point and segment for the selected access point, then selecting a frequency point and segment for the access points in the list of the neighbor cells, and finally assigning different frequency points and segments for the adjacent access points, the candidate frequency point and segment being selected for each access point in turn in the same way.

24. The frequency assignment method according to claim 17, wherein:
when there is a new added access point, the access point management unit obtains information of a neighbor cell frequency point of the new added access point and selectable frequency point resource according to a neighbor cell relationship table of the new added access point, and selects a frequency point different from the neighbor cell frequency point of the new added access point.

25. The frequency assignment method according to claim 17, wherein:
when the access point management unit constructs a network using a partially used subchannel (PUSC) all subchannel method, it selects the candidate frequency point for the access points by: obtaining a list of neighbor cells of each access point, selecting a access point with the simplest neighbor cell relationship, randomly selecting a frequency point and segment for the selected access point, then selecting the frequency point and segment for the access points in the list of the neighbor cells, and finally assigning different frequency points and segments for the adjacent access points, the candidate frequency point and segment being selected for each access point in turn in the same way.

26. The frequency assignment method according to claim 17, wherein:
the access point management unit stores frequency point information of its linked access points, and after one of the linked access points becomes abnormal and restarts up, stores and feeds back its historical frequency point information to the access point.

* * * * *

UNITED STATES PATENT AND TRADEMARK OFFICE
CERTIFICATE OF CORRECTION

PATENT NO. : 8,717,894 B2  
APPLICATION NO. : 13/002108  
DATED : May 6, 2014  
INVENTOR(S) : Shizhuang Zhang Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 376 days.

Signed and Sealed this

Twenty-ninth Day of September, 2015

Michelle K. Lee
*Director of the United States Patent and Trademark Office*